(12) United States Patent
Abotabl et al.

(10) Patent No.: US 12,082,169 B2
(45) Date of Patent: Sep. 3, 2024

(54) UPLINK CHANNEL REPETITION IN AGGREGATED SLOTS FOR FULL DUPLEX SYSTEMS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Gokul Sridharan, Sunnyvale, CA (US); Hung Dinh Ly, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/653,039

(22) Filed: Mar. 1, 2022

(65) Prior Publication Data
US 2023/0284188 A1    Sep. 7, 2023

(51) Int. Cl.
*H04W 72/0446* (2023.01)
*H04L 5/14* (2006.01)
*H04W 72/1268* (2023.01)

(52) U.S. Cl.
CPC .......... *H04W 72/0446* (2013.01); *H04L 5/14* (2013.01); *H04W 72/1268* (2013.01)

(58) Field of Classification Search
CPC ......... H04W 72/0446; H04W 72/1268; H04W 72/0453; H04W 72/23; H04L 5/14; H04L 1/08; H04L 5/0044; H04L 5/0094
See application file for complete search history.

(56) References Cited

U.S. PATENT DOCUMENTS

2023/0254075 A1* 8/2023 Cozzo ................. H04L 1/08
2023/0276438 A1* 8/2023 Rudolf ............... H04W 52/245

* cited by examiner

*Primary Examiner* — Hashim S Bhatti
(74) *Attorney, Agent, or Firm* — Patterson & Sheridan, LLP

(57) ABSTRACT

Aspects of the present disclosure provide techniques for wireless communication. A method by a user equipment (UE) includes receiving scheduling information from a network entity. The scheduling information schedules transmission of a first uplink (UL) channel repetition of a plurality of UL channel repetitions in a first full duplex (FD) slot of a plurality of slots. Additionally, the first UL channel repetition is associated with one or more time domain resource allocations (TDRAs) and one or more frequency domain resource allocations (FDRAs). Additionally, based on the one or more FDRAs associated with the first UL channel repetition, a portion of the first UL channel repetition is scheduled to occur in a downlink subband of the first FD slot. The method also includes taking one or more actions to transmit the first UL channel repetition based on the scheduling information.

30 Claims, 17 Drawing Sheets

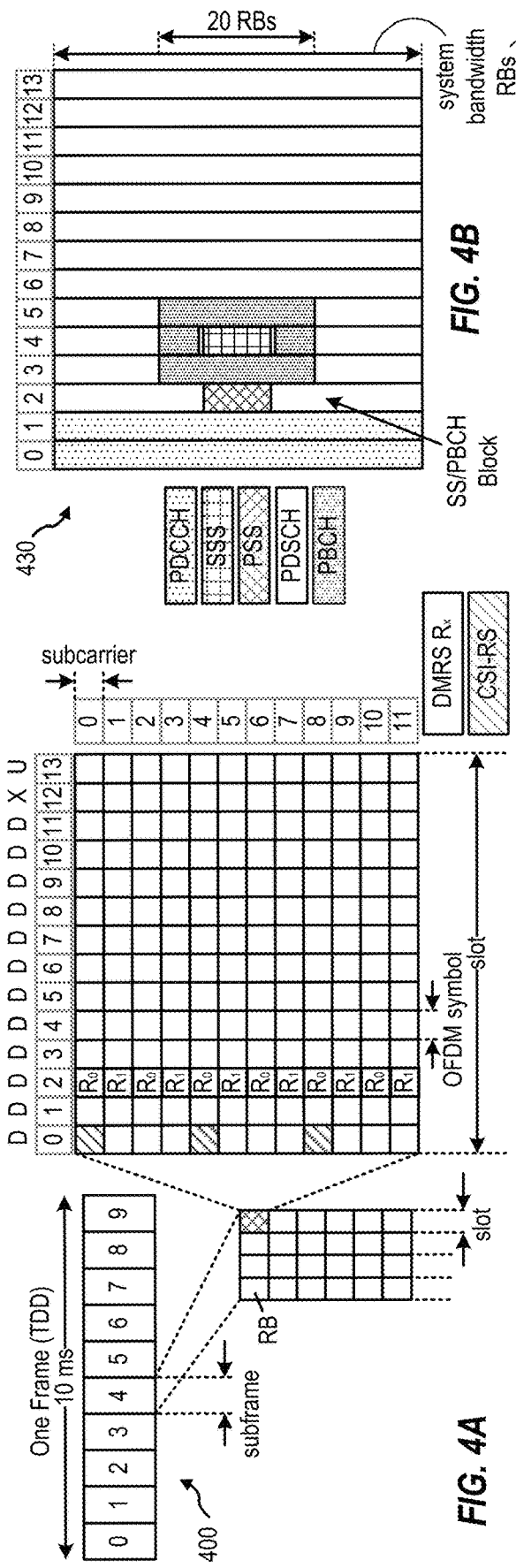
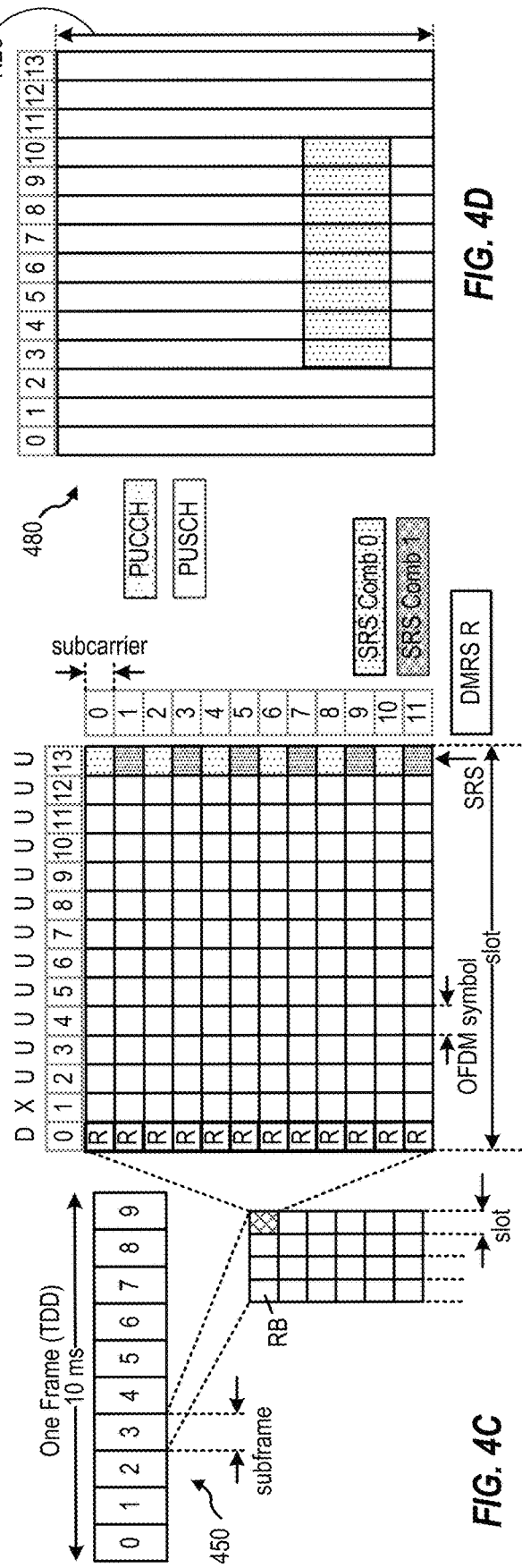

1400

A METHOD FOR WIRELESS COMMUNICATION BY A USER EQUIPMENT (UE)

1402

RECEIVE SCHEDULING INFORMATION FROM A NETWORK ENTITY, WHEREIN:
THE SCHEDULING INFORMATION SCHEDULES TRANSMISSION OF A FIRST UPLINK (UL) CHANNEL REPETITION OF A PLURALITY OF UL CHANNEL REPETITIONS IN A FIRST FULL DUPLEX (FD) SLOT OF A PLURALITY OF SLOTS,
THE FIRST UL CHANNEL REPETITION IS ASSOCIATED WITH ONE OR MORE TIME DOMAIN RESOURCE ALLOCATIONS (TDRAS) AND ONE OR MORE FREQUENCY DOMAIN RESOURCE ALLOCATIONS (FDRAS),
THE FIRST FD SLOT COMPRISES AN UL SUBBAND FOR UL TRANSMISSIONS AND A DOWNLINK (DL) SUBBAND FOR DL TRANSMISSIONS, AND
BASED ON THE ONE OR MORE FDRAS ASSOCIATED WITH THE FIRST UL CHANNEL REPETITION, A PORTION OF THE FIRST UL CHANNEL REPETITION IS SCHEDULED TO OCCUR IN THE DL SUBBAND OF THE FIRST FD SLOT

1404

TAKE ONE OR MORE ACTIONS TO TRANSMIT THE FIRST UL CHANNEL REPETITION BASED ON THE SCHEDULING INFORMATION

A METHOD FOR WIRELESS COMMUNICATION BY A NETWORK ENTITY

1502

TRANSMIT SCHEDULING INFORMATION FROM A NETWORK ENTITY, WHEREIN:
THE SCHEDULING INFORMATION SCHEDULES TRANSMISSION OF A FIRST UPLINK (UL) CHANNEL REPETITION OF A PLURALITY OF UL CHANNEL REPETITIONS IN A FIRST FULL DUPLEX (FD) SLOT OF A PLURALITY OF SLOTS,
THE FIRST UL CHANNEL REPETITION IS ASSOCIATED WITH ONE OR MORE TIME DOMAIN RESOURCE ALLOCATIONS (TDRAS) AND ONE OR MORE FREQUENCY DOMAIN RESOURCE ALLOCATIONS (FDRAS),
THE FIRST FD SLOT COMPRISES AN UL SUBBAND FOR UL TRANSMISSIONS AND A DOWNLINK (DL) SUBBAND FOR DL TRANSMISSIONS, AND
BASED ON THE ONE OR MORE FDRAS ASSOCIATED WITH THE FIRST UL CHANNEL REPETITION, A PORTION OF THE FIRST UL CHANNEL REPETITION IS SCHEDULED TO OCCUR IN THE DL SUBBAND OF THE FIRST FD SLOT

1504

TAKE ONE OR MORE ACTIONS TO RECEIVE THE FIRST UL CHANNEL REPETITION BASED ON THE SCHEDULING INFORMATION

*FIG. 15*

UPLINK CHANNEL REPETITION IN AGGREGATED SLOTS FOR FULL DUPLEX SYSTEMS

BACKGROUND

Field of the Disclosure

Aspects of the present disclosure relate to wireless communications, and more particularly, to techniques for uplink channel repetition in aggregated slots for full duplex systems.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving scheduling information from a network entity. In some cases, the scheduling information schedules transmission of a first uplink (UL) channel repetition of a plurality of UL channel repetitions in a first full duplex (FD) slot of a plurality of slots. In some cases, the first UL channel repetition is associated with one or more time domain resource allocations (TDRAs) and one or more frequency domain resource allocations (FDRAs). In some cases, the first FD slot comprises an UL subband for UL transmissions and a downlink (DL) subband for DL transmissions. In some cases, based on the one or more FDRAs associated with the first UL channel repetition, a portion of the first UL channel repetition is scheduled to occur in the DL subband of the first FD slot. The method may also include taking one or more actions to transmit the first UL channel repetition based on the scheduling information.

One aspect provides a method for wireless communication by a network entity. The method includes transmitting scheduling information from a network entity. In some cases, the scheduling information schedules transmission of a first uplink (UL) channel repetition of a plurality of UL channel repetitions in a first full duplex (FD) slot of a plurality of slots. In some cases, the first UL channel repetition is associated with one or more time domain resource allocations (TDRAs) and one or more frequency domain resource allocations (FDRAs). In some cases, the first FD slot comprises an UL subband for UL transmissions and a downlink (DL) subband for DL transmissions. In some cases, based on the one or more FDRAs associated with the first UL channel repetition, a portion of the first UL channel repetition is scheduled to occur in the DL subband of the first FD slot. The method may also include taking one or more actions to receive the first UL channel repetition based on the scheduling information.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

FIG. 14 depicts a method for wireless communication.

FIG. 15 depicts a method for wireless communication.

DETAILED DESCRIPTION

Figure 1:
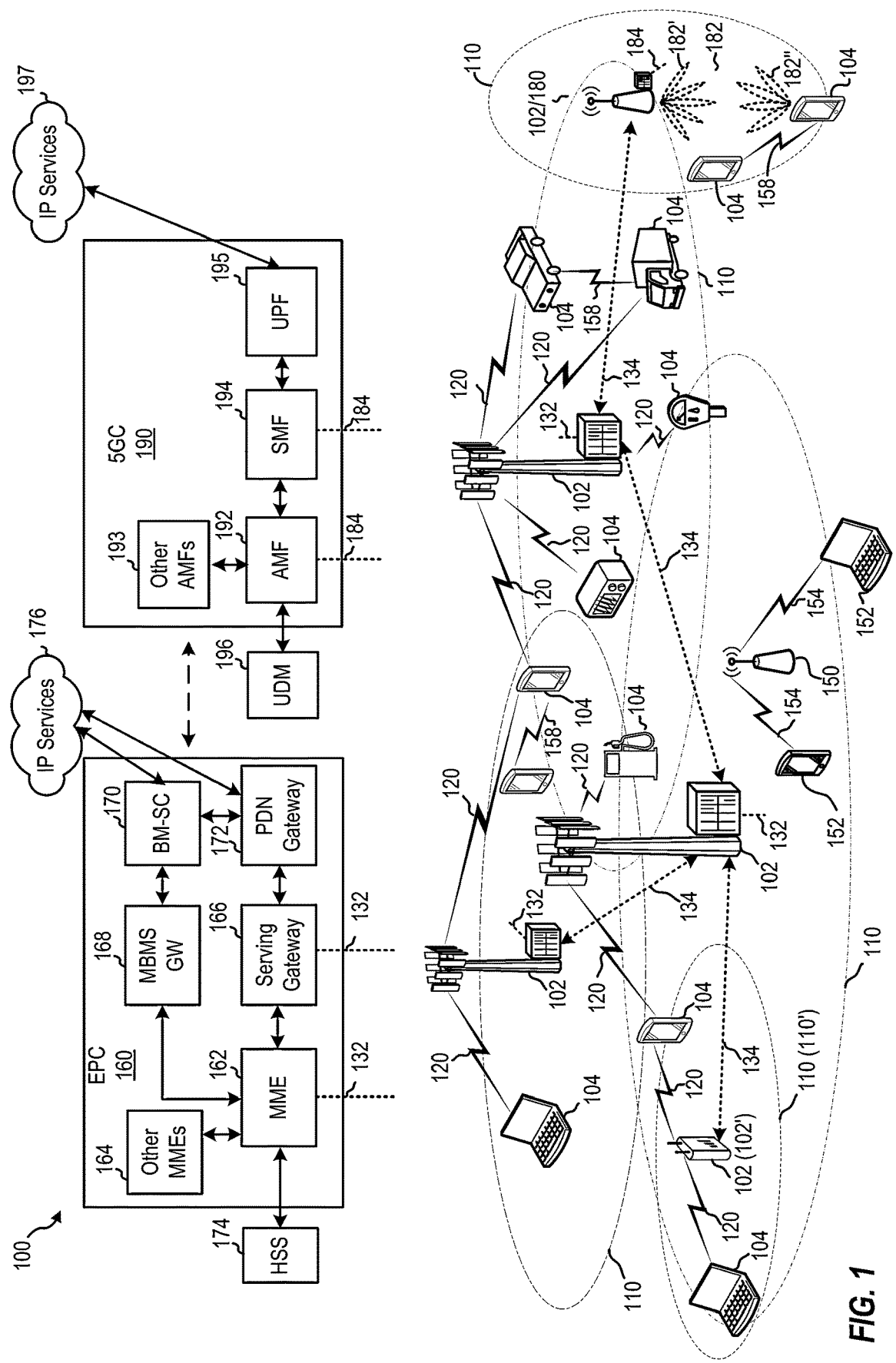
FIG. 1 depicts an example wireless communication network.

Aspects of the present disclosure provide apparatuses, methods, processing systems, and computer-readable mediums for uplink channel repetition in aggregated slots for full duplex systems.

For example, a user equipment (UE) in a wireless network may be scheduled to transmit uplink data in a transport block (TB) via a physical uplink shared channel (PUSCH). In some cases, to improve data transmission coverage of uplink transmissions, the UE may repeat transmission of the TB over multiple slots, known as PUSCH repetition. In some cases, multiple copies (e.g., repetitions) may be transmitted within one slot or may be transmitted over multiple slots.

When transmitting PUSCH, these PUSCH transmissions must be transmitted within uplink resources (e.g., an uplink subband) of a slot. In legacy systems, symbols within a slot allocated for PUSCH transmission included only uplink frequency resources (e.g., only an uplink subband). However, in emerging systems, there may be cases in which subband full duplex (SBFD) is supported by a base station within certain slots. SBFD may result, in some cases, in symbols of a slot, in which PUSCH transmissions are to be transmitted, having frequency resources (e.g., uplink subbands) allocated for uplink transmissions as well as frequency resources (e.g., downlink subbands) allocated for downlink transmissions where the frequency resources of the UL and DL subband are non-overlapping. In other words, there may be cases in which frequency resources in a slot may be split among frequency resources for uplink transmissions and frequency resources for downlink transmissions.

Due to the uplink subbands of SBFDs only occupying a limited portion of a BWP of the SBFD slots, SBFD slots may cause issues when transmitting PUSCH as there may be cases in which frequency resources over which the PUSCH repetitions are scheduled to be transmitted may not coincide with the frequency resources allocated for the uplink transmissions within the SBFD slots. For example, given the limited portion of the BWP that an uplink subband occupies in an SBFD slot, there may be a chance that the uplink subband of the SBFD slot is not able to accommodate a TB of the same size as an uplink only slot. As a result, there is chance that the uplink subband of the SBFD slot is not able to accommodate information bits and/or a minimum number of required parity bits of the TB.

Proceeding ahead with transmitting the PUSCH repetitions via frequency resources that do not coincide with the frequency resources for uplink transmissions in an SBFD slot, may lead to interference with downlink transmissions. This interference may cause both of the PUSCH repetitions and downlink transmissions to have to be retransmitted, resulting in wasted time and frequency resources within a wireless network as well as wasted power resources at the devices performing the retransmissions. Additionally, if the UE decides to drop the PUSCH repetition that does not coincide with the frequency resources for uplink transmissions in the SBFD slot, this may reduce data transmission coverage of data transmitted on the PUSCH and can lead to increase latency and additional retransmissions if the PUSCH data is not received correctly due to the dropped PUSCH repetition. Moreover, if the UE were to proceed with only transmitting the portion of the PUSCH repetitions that do occur within the uplink subband of the SBFD slot, there is a possibility that these PUSCH repetitions may not be decodable due to missing information and/or parity bits, again resulting in wasted time, frequency, and power resources.

Therefore, aspects of the present disclosure provide techniques for to help resolve the issues described above when transmitting PUSCH repetitions in full duplex slots that include limited uplink frequency resources. For example, in some cases, when at least a portion of a PUSCH repetition is scheduled to occur outside of an uplink subband of a full duplex slot, these techniques may include aggregating the full duplex slot with a number of additional slots. Transmission of the PUSCH repetition may then be extended in a time domain such that the entire PUSCH repetition may be transmitted within the an uplink subband of the aggregated slot. As a result, interference to downlink transmissions within the full duplex slot may be avoided and failed decodings/retransmissions of the PUSCH repetition may be reduced, thereby reducing wasted time, frequency, and power resources.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
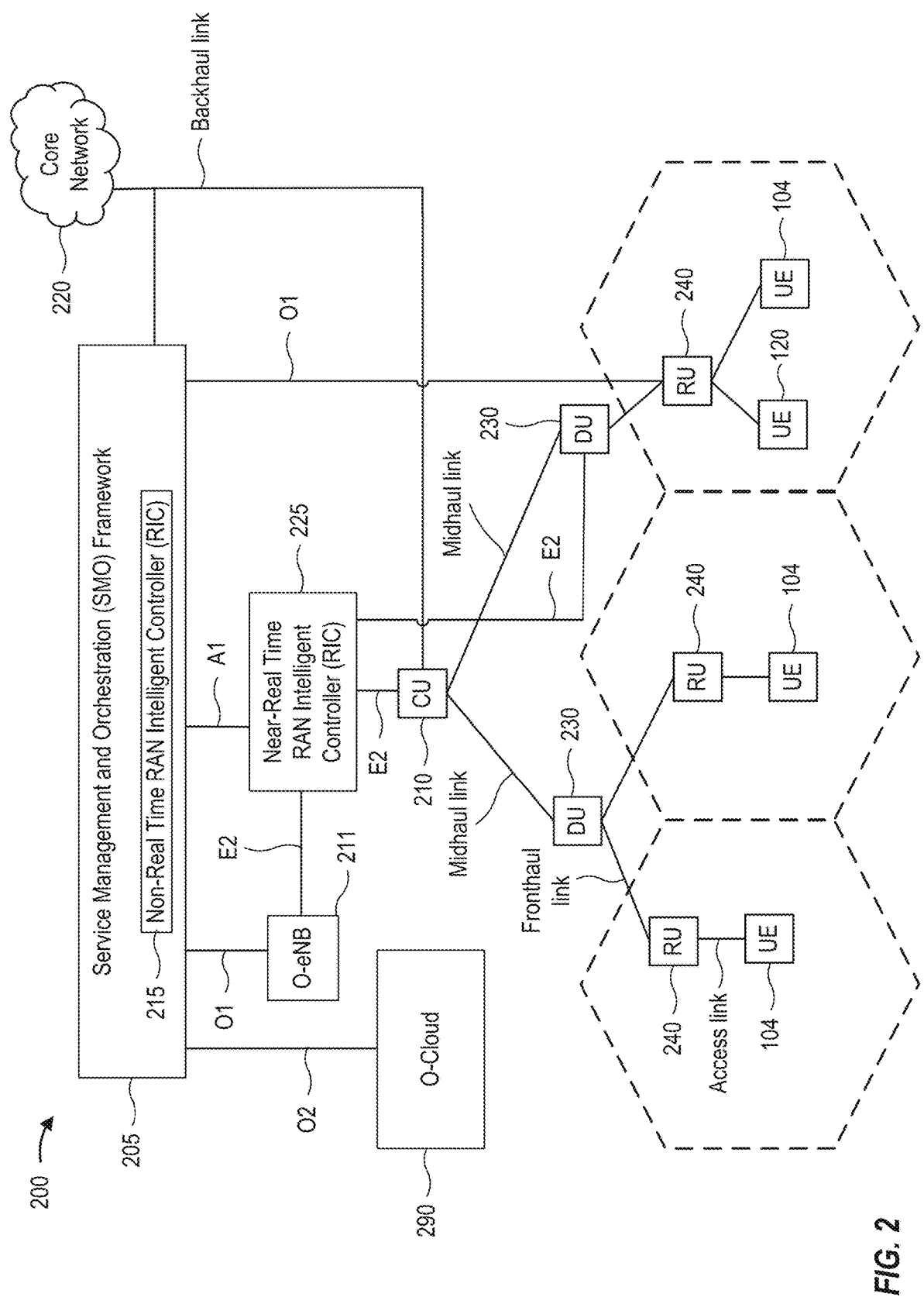
FIG. 2 depicts an example disaggregated base station architecture.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
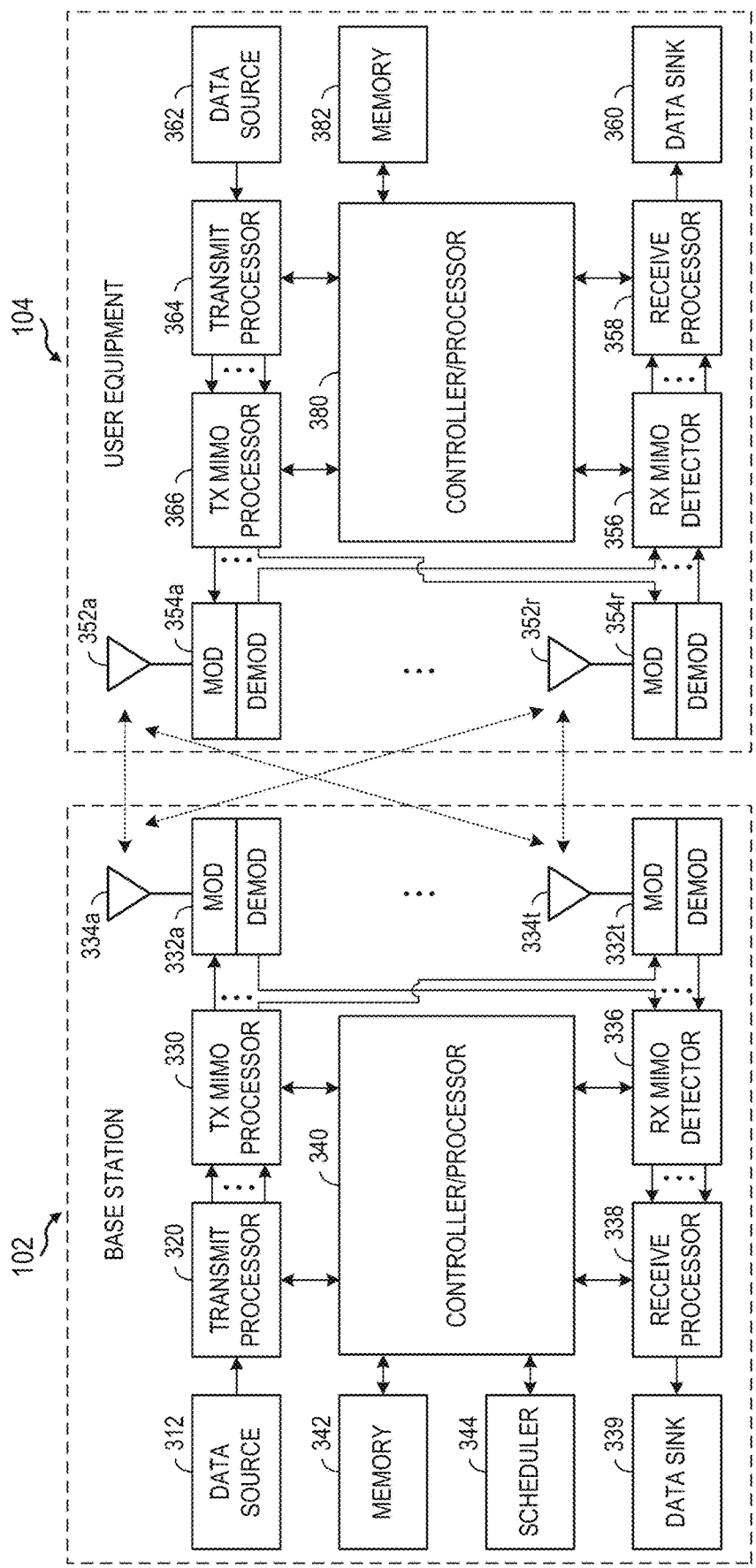
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Multi-Antenna Panel and Full Duplex Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 5A:
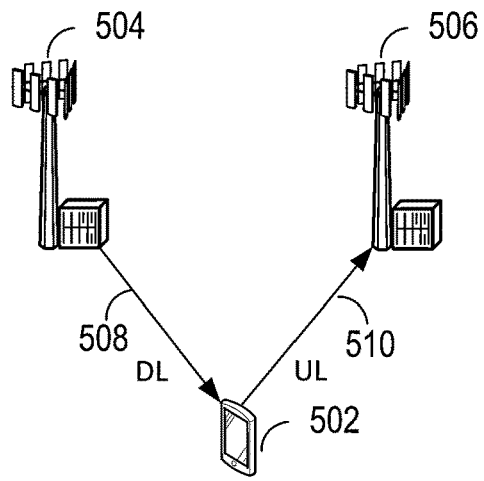
FIGS. 5A, 5B, and 5C illustrates various full-duplex use cases within a wireless communication network.
Figure 5B:
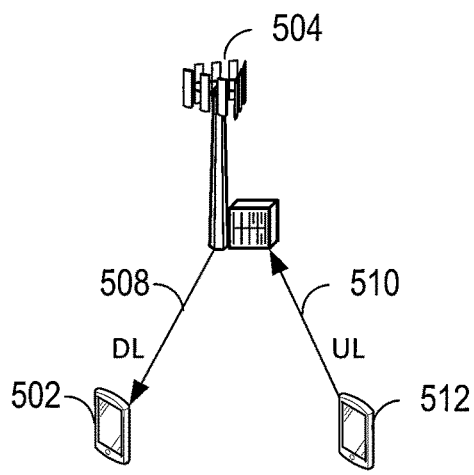
Figure 5C:
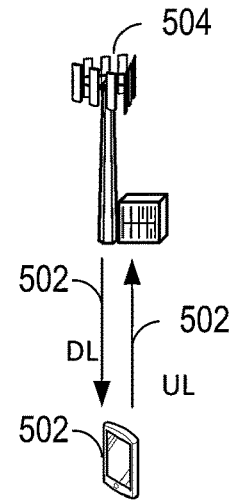

FIGS. 5A-5C illustrates different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 506 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline 5G behavior |
| FD disabled | FD enabled | Use case #1 (FIG. 5A) for mTRP |
| FD enabled | FD disabled | Use case #2 (FIG. 5B) + IAB |
| FD enabled | FD enabled | Use case #3 (FIG. 5C) |

As shown, if FD capability is disabled at both the base station and UE, the baseline 5G behavior may be used (e.g., HD communication). If FD capability is disabled at the BS but enabled at the UE, the UE may operate according to the first example FD use case shown in FIG. 5A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 5B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 5C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Introduction to Physical Uplink Data Channel Repetition

In some cases, a user equipment (UE) may be scheduled to transmit uplink data on a physical uplink shared channel (PUSCH). A base station (BS) may schedule uplink transmissions on the PUSCH by transmitting downlink control information (DCI) to the UE that includes a dynamic grant (DG) or may transmit or radio resource control (RRC) signaling to the UE that includes a configured grant (CG).

DGs may include an indication of one or more time and frequency resources for transmitting an uplink transmission on the PUSCH. In some cases, the one or more time and frequency resources may be non-periodic and may be allocated to the UE for a particular uplink transmission. As such, when another uplink transmission needs to be scheduled for the UE, the BS may transmit another dynamic grant with additional scheduling information for this other uplink transmission. Conversely, CGs allocate a periodic set of time and frequency resources to the UE, which may be shared with multiple other UEs. For example, a base station may transmit a CG that allocates the resources to multiple UEs, and the UEs may randomly utilize the resources when they have data to transmit.

When scheduled, the UE may transmit uplink data in a transport block (TB) on the PUSCH. In some cases, to improve data transmission coverage of uplink transmissions, the UE may repeat transmission of the TB over multiple slots, known as PUSCH repetition. In some cases, one TB may be transmitted in one slot and multiple copies (e.g., repetitions) of the TB may be transmitted over multiple slots. The multiple copies/repetitions of the TB may be transmitted using different redundancy versions (RVs). In some cases, time domain resources for the TB transmission within a slot may be indicated via a start and length indicator value (SLIV) from a time domain resource allocation (TDRA) table, which may indicate a starting symbol (S) and a length (L) of a repetition within the slot. In some cases, a frequency domain resource allocation (FDRA) for the TB transmission within the slot may be indicted via a plurality of parameters, such as a starting resource block (RB) within the slot and a number of consecutive RBs Different types of PUSCH repetition may be used, such as PUSCH repetition type-A and PUSCH repetition type-B. Both PUSCH repetition types may be applicable to DG and CG.

Figure 6A:
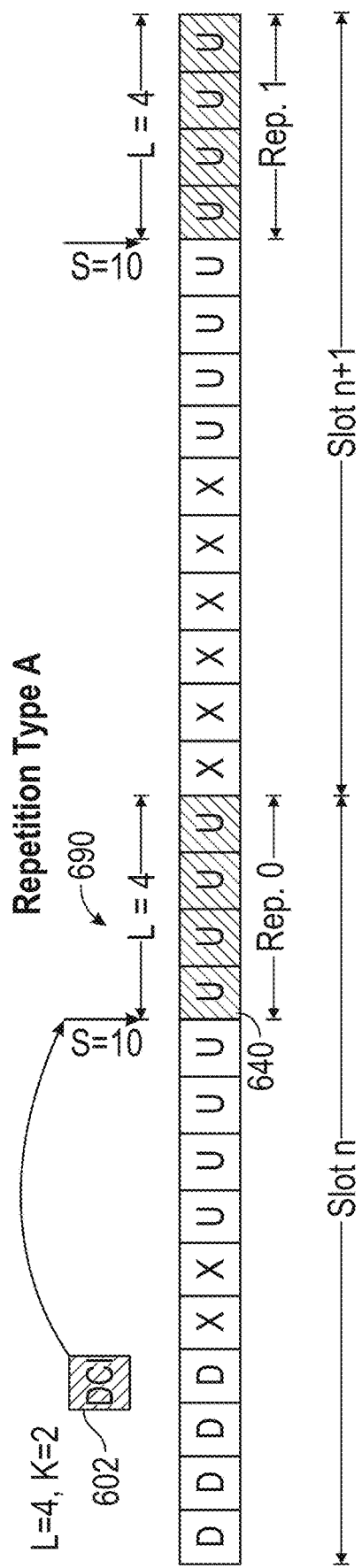
FIGS. 6A and 6B illustrate different examples of physical uplink shared channel (PUSCH) repetition.

FIG. 6A illustrates an example of PUSCH repetition type-A. The symbols shown in FIG. 6A may be either configured for downlink (labeled "D"), configured for uplink (labeled "U"), or configured as a special or flexible symbol (labeled "X") which can be either designated as downlink or uplink. In some cases, a BS may indicate a number of repetitions K to a UE to be applied for PUSCH. If the number of repetitions K is greater than 1, the same start and length indicator (indicated by a start and length indicator value (SLIV)) may be applied across K consecutive slots. SLIV indicates the start symbol and length of PUSCH. For example, DCI 602 may indicate SLIV for PUSCH transmission 690, such as a start symbol 640 (e.g., S=10) with a length L of 4 symbols, as shown in FIG. 6A. As shown, the PUSCH may be transmitted based on the same SLIV in each of the K consecutive slots. For example, repetition 0 of a PUSCH TB may be transmitted in a segment of slot n and repetition 1 of the PUSCH TB may be transmitted in a segment of slot n+1, as shown. As used herein, a segment generally refers to a group of consecutive uplink configured symbols or a group of consecutive downlink configured symbols, as shown in FIG. 6A and FIG. 6B.

Figure 6B:
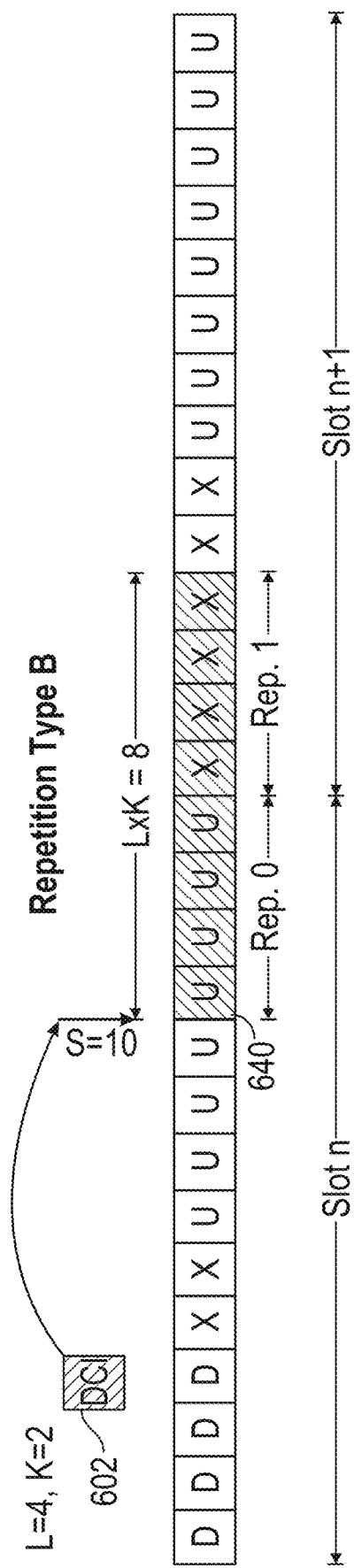

FIG. 6B illustrates an example of PUSCH repetition type-B. The symbols shown in FIG. 6B may be either configured for downlink (labeled "D"), configured for uplink (labeled "U"), or configured as a special or flexible symbol (labeled "X") which can be either designated as downlink or uplink. As shown, the repetitions of a PUSCH TB may be within or across slots. For example, the PUSCH may cross a slot boundary, such as the boundary between slot n and n+1 shown in FIG. 6B.

In some aspects, dynamic indication of a number of repetitions may be implemented. That is, DCI 602 may indicate SLIV for the PUSCH TB repetitions. For example, a start at symbol (S=10) may be indicated with K=2 repetitions, as shown. More generally, DCI 602 may indicate that K nominal repetitions, each with nominal length L, may be sent back-to-back starting from symbol 640 (S=10), where S and L are given by SLIV. Accordingly, as shown in FIG. 6B, repetition 0 may be transmitted in a segment of slot n and repetition 1 may be transmitted in a segment of slot n+1, where the segments are contiguous. Moreover, while FIGS. 6A and 6B have illustrated an example uplink/downlink (U/D) symbol interaction and SLIV configuration to facilitate understanding, any U/D symbol interaction or SLIV configuration may be used.

Aspects Related to Uplink Channel Repetition in Aggregated Slots for Full Duplex Systems When transmitting PUSCH repetitions, these PUSCH repetitions must be transmitted within uplink resources (e.g., an uplink subband) of a slot. In legacy systems, this was not an issue since frequency resources and symbols within a slot allocated for transmission of PUSCH repetitions included only uplink frequency resources (e.g., only an uplink subband). However, in emerging systems, there may be cases in which subband full duplex (SBFD) is supported by a base station within certain slots. SBFD may result, in some cases, in symbols of a slot, in which PUSCH repetitions are to be transmitted, having frequency resources (e.g., uplink subbands) allocated for uplink transmissions as well as frequency resources (e.g., downlink subbands) allocated for downlink transmissions. In other words, there may be cases in which frequency resources in a slot may be split among frequency resources for uplink transmissions and frequency resources for downlink transmissions.

Figure 7:
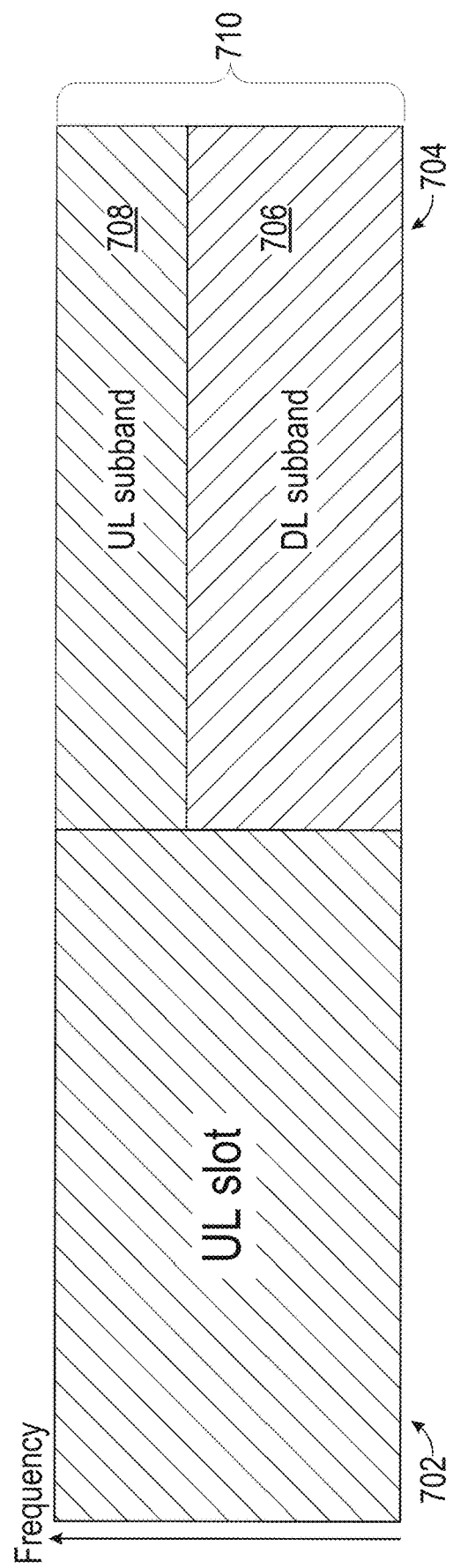
FIG. 7 illustrates an example slot format, including an uplink slot and an SBFD slot.

FIG. 7 illustrates an example slot format, including an uplink slot 702 and an SBFD slot 704. As shown, the uplink slot 702 and SBFD slot 704 are associated with a bandwidth part (BWP) 710, which may be regulated by a parameter known as UL-BWP. Further, as shown, frequency resources within the uplink slot 702 comprise frequency resources allocated only for uplink transmissions. In other words, the frequency resources within the uplink slot 702 for uplink transmissions may span the entire BWP 710. In contrast, SBFD slot 704 includes a DL subband 706 including frequency resources allocated for downlink transmissions and an UL subband 708 including frequency resources allocated for uplink transmissions. As shown, each of the DL subband 706 and UL subband 708 only span a limited portion (e.g., a limited number of RBs) of the BWP 710.

Due to the uplink subbands of SBFDs only occupying a limited portion of a BWP of the SBFD slots, SBFD slots may cause issues when transmitting PUSCH as there may be cases in which frequency resources over which the PUSCH repetitions are scheduled to be transmitted may not coincide with the frequency resources allocated for the uplink transmissions (e.g., in the uplink subband 808) within the SBFD slots. For example, given the limited portion of the BWP that an uplink subband occupies in an SBFD slot, there may be a chance that the uplink subband of the SBFD slot is not able to accommodate a TB of the same size as an uplink only slot. As a result, there is chance that the uplink subband of the SBFD slot is not able to accommodate information bits and/or a minimum number of required parity bits of the TB.

If a UE were to proceed ahead with transmitting the PUSCH repetitions via frequency resources that do not coincide with the frequency resources for uplink transmissions in an SBFD slot, these PUSCH repetition transmissions may interfere with downlink transmissions. This interference may cause both of the PUSCH repetitions and downlink transmissions to have to be retransmitted, resulting in wasted time and frequency resources within a wireless network as well as wasted power resources at the devices performing the retransmissions. Additionally, if the UE decides to drop the PUSCH repetition that does not coincide with the frequency resources for uplink transmissions in the SBFD slot, this may reduce data transmission coverage of data transmitted on the PUSCH and can lead to increase latency and additional retransmissions if the PUSCH data is not received correctly due to the dropped PUSCH repetition. Moreover, if the UE were to proceed with only transmitting the portion of the PUSCH repetitions that do occur within the uplink subband of the SBFD slot, there is a possibility that these PUSCH repetitions may not be decodable due to missing information and/or parity bits, again resulting in wasted time, frequency, and power resources.

Therefore, aspects of the present disclosure provide techniques for to help resolve the issues described above when transmitting PUSCH repetitions in full duplex slots that include limited uplink frequency resources. For example, in some cases, when at least a portion of a PUSCH repetition is scheduled to occur outside of an uplink subband of a full duplex slot, these techniques may include aggregating the full duplex slot with a number of additional slots. Transmission of the PUSCH repetition may then be extended in a time domain such that the entire PUSCH repetition may be transmitted within the an uplink subband of the aggregated slot. As a result, interference to downlink transmissions within the full duplex slot may be avoided and failed decodings/retransmissions of the PUSCH repetition may be reduced, thereby reducing wasted time, frequency, and power resources.

Example Operations of Entities in a Communication Network

Figure 8:
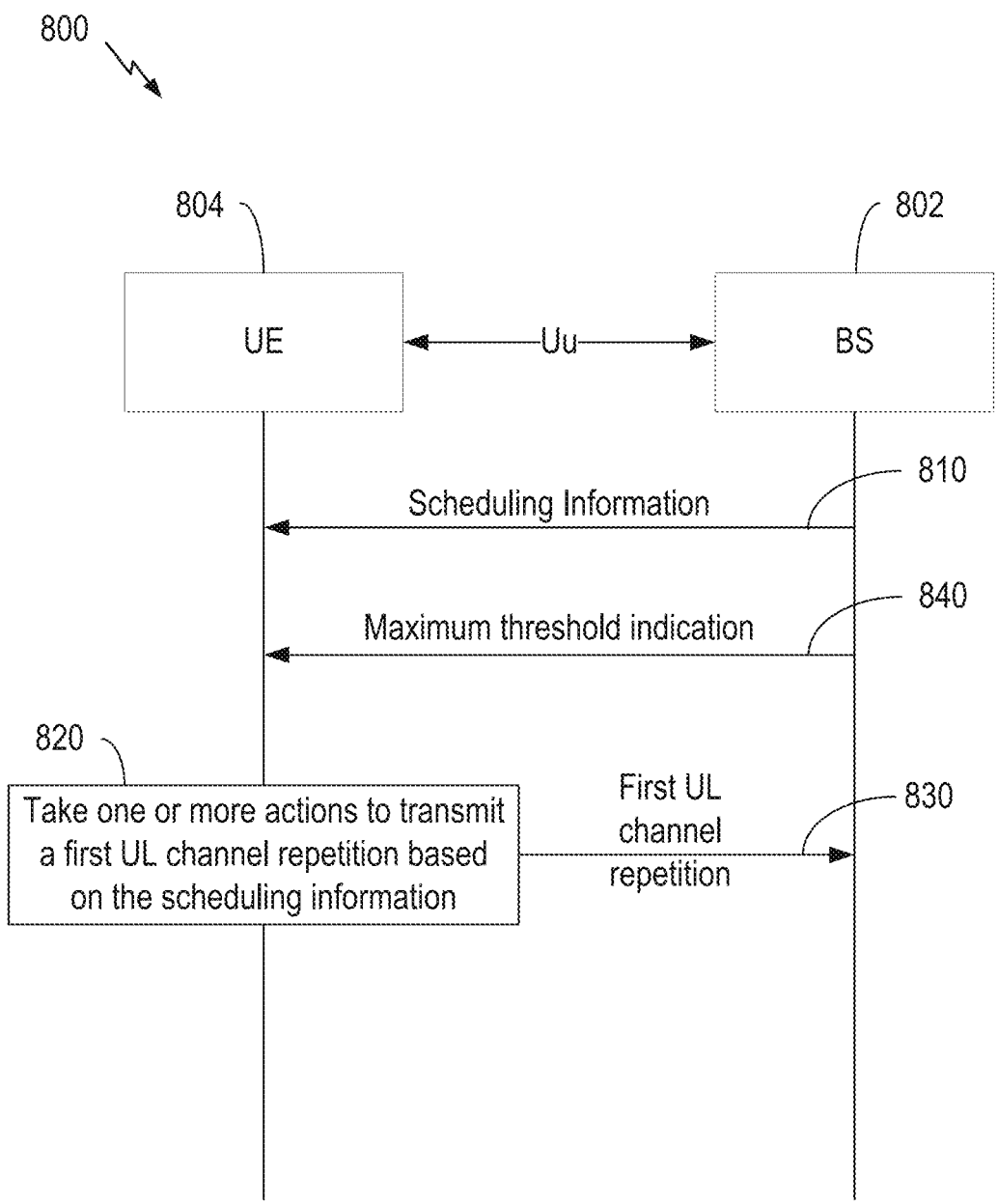
FIG. 8 depicts a process flow for communication in a network between a network entity and a user equipment.

FIG. 8 depicts a process flow illustrating example operations 800 for communication in a network between a network entity 802 and a user equipment (UE) 804. In some aspects, the network entity 802 may be an example of the BS 102 depicted and described with respect to FIGS. 1 and 3. In some cases, the network entity 802 may be an example of a disaggregated base station depicted and described with respect to FIG. 2. Similarly, the UE 804 may be an example of UE 104 depicted and described with respect to FIGS. 1 and 3. However, in other aspects, UE 104 may be another type of wireless communication device and BS 102 may be another type of network entity or network node, such as those described herein.

As shown, operations 800 begin at 810 with the UE 804 receiving scheduling information from the network entity 802, scheduling transmission of a first uplink (UL) channel repetition of a plurality of UL channel repetitions (e.g., PUSCH repetitions) in a first full duplex (FD) slot of a plurality of slots. In some cases, the first FD slot comprises an UL subband for UL transmissions (e.g., UL subband 708 illustrated in FIG. 7) and a downlink (DL) subband for DL transmissions (e.g., DL subband 706 illustrated in FIG. 7).

In some cases, the first UL channel repetition may include a TB carrying information bits and parity bits, and may be associated with one or more TDRAs and one or more FDRAs. As noted above, the one or more TDRAs may indicate a starting symbol and length of the first UL channel repetition in the first FD slot. Additionally, the one or more FDRAs may indicate, for example, a starting RB and a number of consecutive RB s allocated for the first UL channel repetition within the first FD slot.

Figure 9:
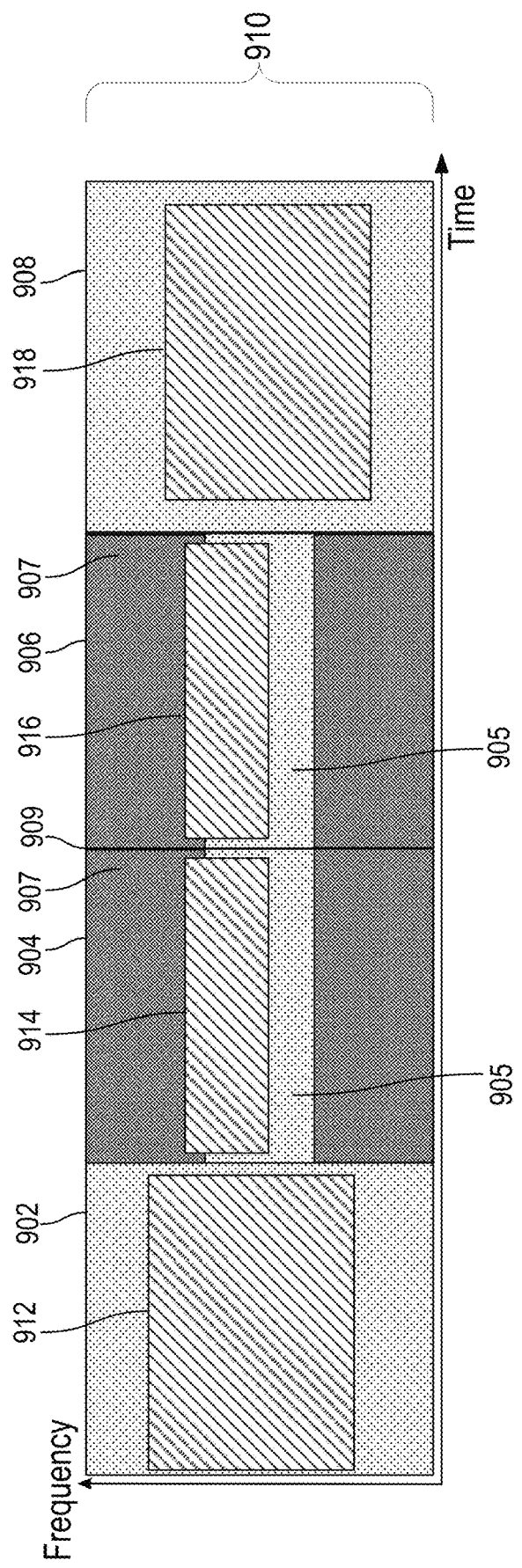
FIG. 9 illustrates a scenario in which a portion of an uplink channel repetition is scheduled to occur in the downlink subband of the full duplex slot.

In some cases, based on the one or more FDRAs associated with the first UL channel repetition, a portion (e.g., some information bits and/or parity bits) of the first UL channel repetition may be scheduled to occur in the DL subband of the first FD slot. FIG. 9 provides an illustration of a scenario in which a portion of the first UL channel repetition is scheduled to occur in the DL subband of the first FD slot.

For example, as shown in FIG. 9, a slot format 900 includes a first UL slot 902, a first FD slot 904, a second FD slot 906, and a second UL slot 908. The first UL slot 902 and second UL slot 908 each include an UL subband that spans an entire BWP 910. Conversely, the first FD slot 904 and second FD slot 906 include an UL subband 905 and a DL subband 907 which each span a different portion of the BWP 910. As a result, the UL subband 905 of the first FD slot 904 and second FD slot 906 is smaller than the UL subband of the first UL slot 902 and second UL slot 908.

Further, as can be seen, the first UL slot 902 includes PUSCH repetition 912, the first FD slot 904 includes PUSCH repetition 914, the second FD slot 906 includes PUSCH repetition 916, and the second UL slot 908 includes PUSCH repetition 918. In the example illustrated in FIG. 9, the first FD slot 904 may be considered the first FD slot discussed with respect to the operations 800 and the PUSCH repetition 914 may be considered the first UL channel repetition discussed with respect to the operations 800.

As shown, PUSCH repetition 912 and PUSCH repetition 918 are completely contained within the UL subband of the first UL slot 902 and second UL slot 908, respectively. Conversely, as can be seen, portions of the PUSCH repetitions 914 and 916 are scheduled to occur within the DL subband 907.

When the portion of the first UL channel is scheduled to occur in the DL subband of the first FD slot, as shown in FIG. 9, the UE 804 may take one or more actions in step 820 in FIG. 8 to transmit the first UL channel repetition based on the scheduling information received at 810 from the network entity 802. For example, in some cases, based on the portion of the first UL channel scheduled to occur in the DL subband of the first FD slot, taking the one or more actions in to transmit the first UL channel repetition in step 820 may include merging one or more additional slots with the first FD slot to form an aggregated slot comprising the UL subband and the DL subband. Additionally, taking the one or more actions in to transmit the first UL channel repetition in step 820 may also include extending transmission of the first UL channel repetition in a time domain such that the first UL channel repetition, including the portion of the first UL channel scheduled to occur in the DL subband of the first FD slot, is transmitted within the UL subband of the aggregated slot. Further, taking the one or more actions in to transmit the first UL channel repetition in step 820 may also include transmitting the first UL channel repetition in the aggregated slot (e.g., extended in the time domain) based on the scheduling information, as shown in step 840 of FIG. 8.

Figure 10:
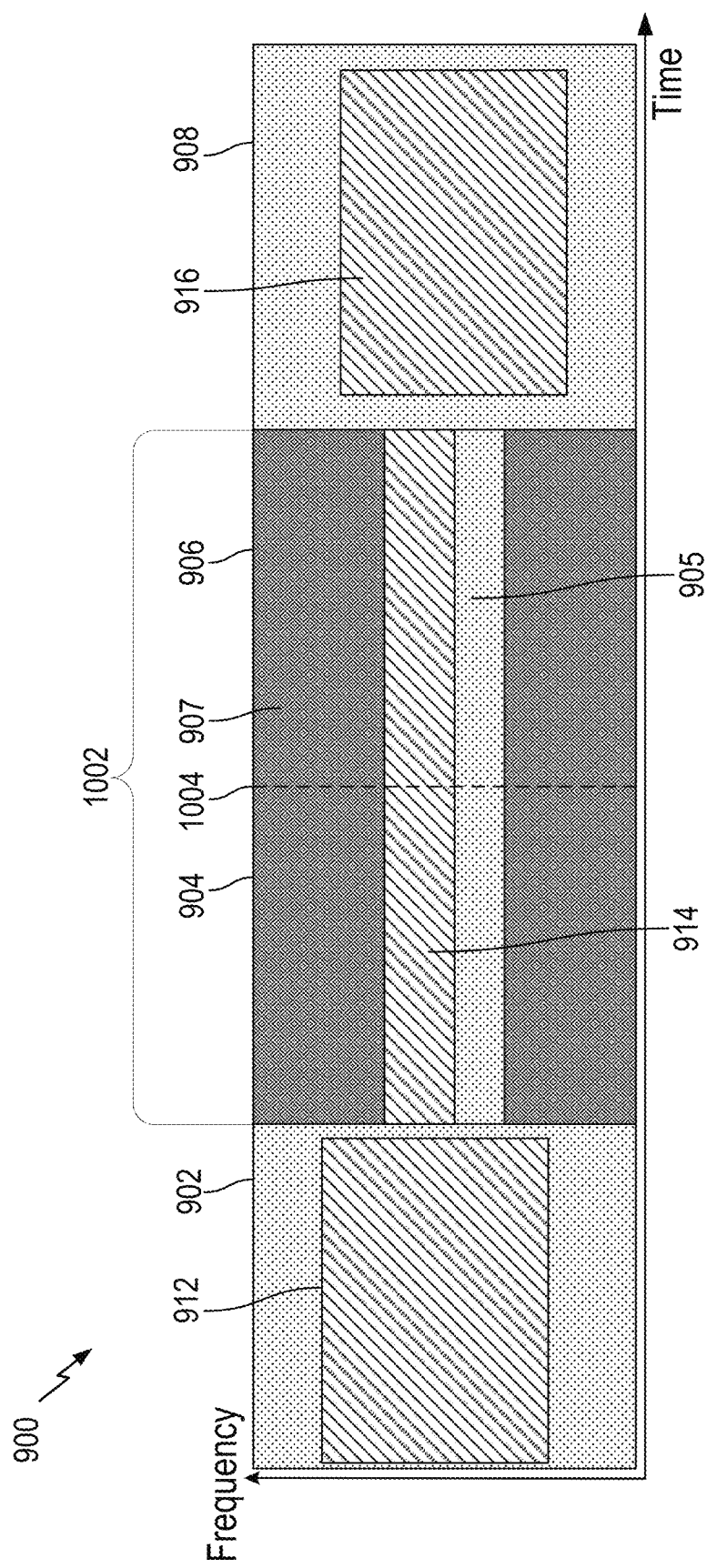
FIG. 10 illustrates merging of slots and extending transmission of the uplink channel repetition.

An example of this merging of slots and extending of the first UL channel repetition is shown in FIG. 10. For example, FIG. 10 again illustrates the slot format 900 including the first UL slot 902, the first FD slot 904, the second FD slot 906, and the second UL slot 908. As noted above, a portion of the PUSCH repetition 914 in the first FD slot 904 in FIG. 9 was scheduled to occur within the DL subband 907 of the first FD slot 904. When this occurs, the UE 804 may merge the first FD slot 904 with one or more additional slots, such as the second FD slot 906, to form an aggregated slot 1002. The PUSCH repetition 914 may then be extended in the time domain such that the PUSCH repetition 914 (including the portion originally scheduled to occur within the DL subband 907) is transmitted only within the UL subband 905 of the aggregated slot 1002. For example, in some cases, the UE 804 may transmit the portion of the of the PUSCH repetition 914 that was scheduled to occur within the DL subband 907 of the first FD slot 904 within the UL subband 905 of the second FD slot 906.

As can be seen, when the second FD slot 906 is merged with the first FD slot 904, a slot boundaries 1004 between the second FD slot 906 and the first FD slot 904 is removed and the PUSCH repetition 914 is transmitted as one continuous repetition in the aggregated slot 1002. By extending the transmission the PUSCH repetition 914 in the time domain, the UE 804 may be able to compensate for a lower number of RBs in the UL subband 905 as compared to the UL subband of the first UL slot 902, allowing the UE to transmit a TB of a same size as a TB transmitted in the PUSCH repetition 912 in the first UL slot 902.

In some cases, when the one or more additional slots are merged with the first FD slot, the one or more additional slots may not be available for transmitting other repetitions of the plurality of UL channel repetitions. For example, as shown in FIG. 10, when the second FD slot 906 is merged with the first FD slot 904, the second FD slot 906 may not be available for transmitting the PUSCH repetition 916. In such cases, the PUSCH repetition 916 may be transmitted in a subsequent available slot (e.g., a non-aggregated/merged slot), such as the second UL slot 908. As such, an aggregation of consecutive SBFD slots, such as the aggregated slot 1002, may be considered/counted as one available slot by considering available RBs in time across multiple slots and frequency. This may apply to both PUSCH repetition type A and type B.

In some cases, the UE 804 may be configured to merge the first FD slot with a minimum number of additional slots to satisfy requirements of a UL channel repetition. More specifically, for example, if the first UL channel repetition is able to be completely transmitted using resources within two slots, then the UE 804 should only merge the first FD slot and one additional slot. The UE 804 should not merge more slots than are necessary for transmitting the first UL channel repetition. For example, assuming that the PUSCH repetition 914 in FIG. 10 is able to be fully transmitted within the first FD slot 904 and second FD slot 906 when merged, the UE 804 should not also merge the second UL slot 908 with the first FD slot 904 and second FD slot 906.

The scheduling information received by the UE 804 in step 810 may include the one or more TDRAs associated with the first UL channel repetition. In some cases, the TRDA may be indicated in different manners. For example, in some cases, the one or more TDRAs associated with the first UL channel repetition comprises one TDRA for the aggregated slot 1002. In some cases, the one or more TDRAs associated with the first UL channel repetition may include a plurality of TDRAs. The plurality of TDRAs may include one TDRA for each slot of the aggregated slot 1002. For example, in such cases, the plurality of TDRAs may include a first TDRA for the PUSCH repetition 914 for the first FD slot 904 of the aggregated slot 1002 and a second TRDA for the PUSCH repetition 914 for the second FD slot 906 of the aggregated slot 1002. In some cases, the first TDRA and the second TDRA may be the same.

Figure 11:
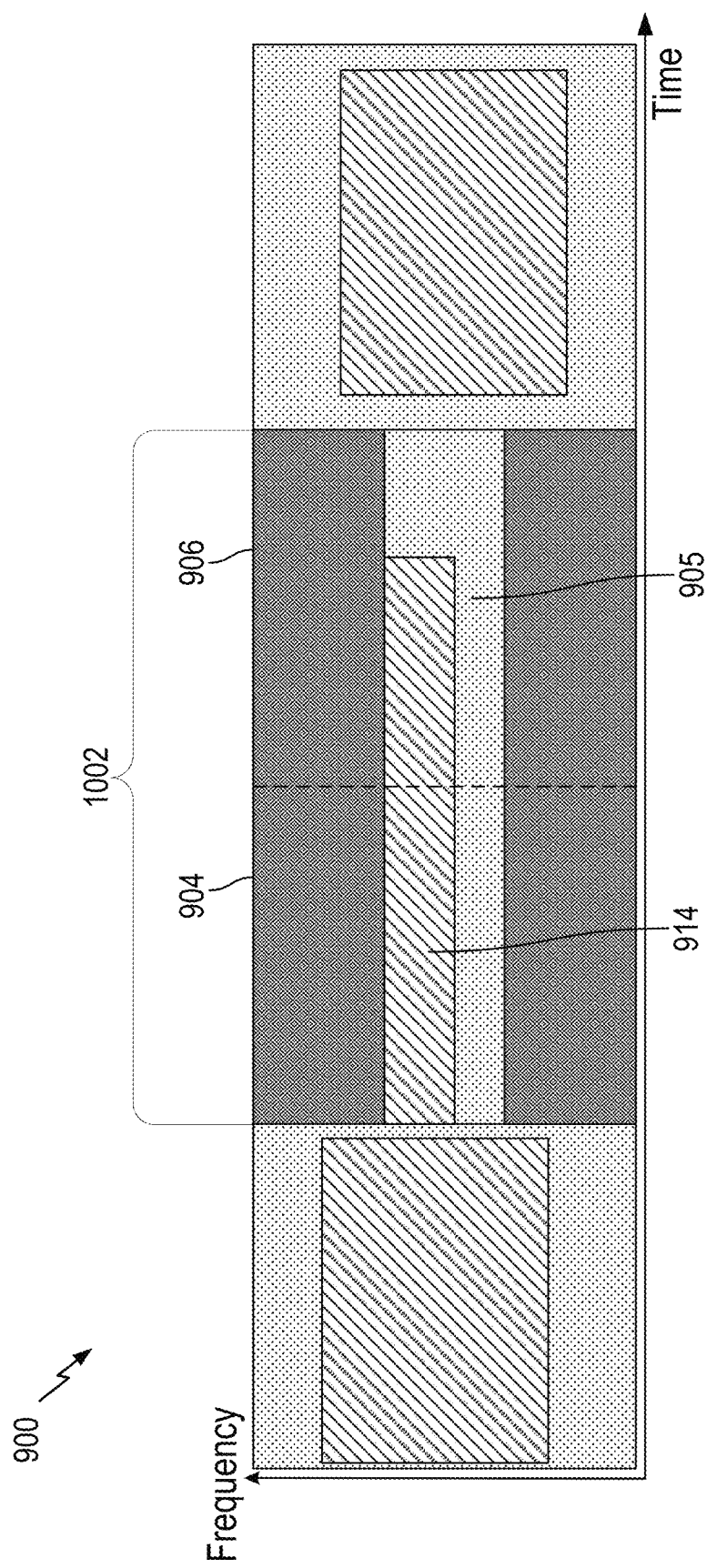
FIG. 11 illustrates different time domain resource allocations for the uplink channel repetition.

In some cases, the first TDRA and the second TDRA may be different. For example, as shown in the slot format 900 illustrated in FIG. 11, based on a first TDRA, a portion of the PUSCH repetition 914 transmitted within the UL subband 905 of the first FD slot 904 of the aggregated slot 1002 spans the entire first FD slot 904 in time. However, based on the second TDRA (e.g., which may be different from the first TDRA), a portion of the PUSCH repetition 914 transmitted within the UL subband 905 of the second FD slot 906 of the aggregated slot 1002 spans only a limited portion of the second FD slot 906 in time (e.g., not the entire second FD slot 906 in time).

Figure 12:
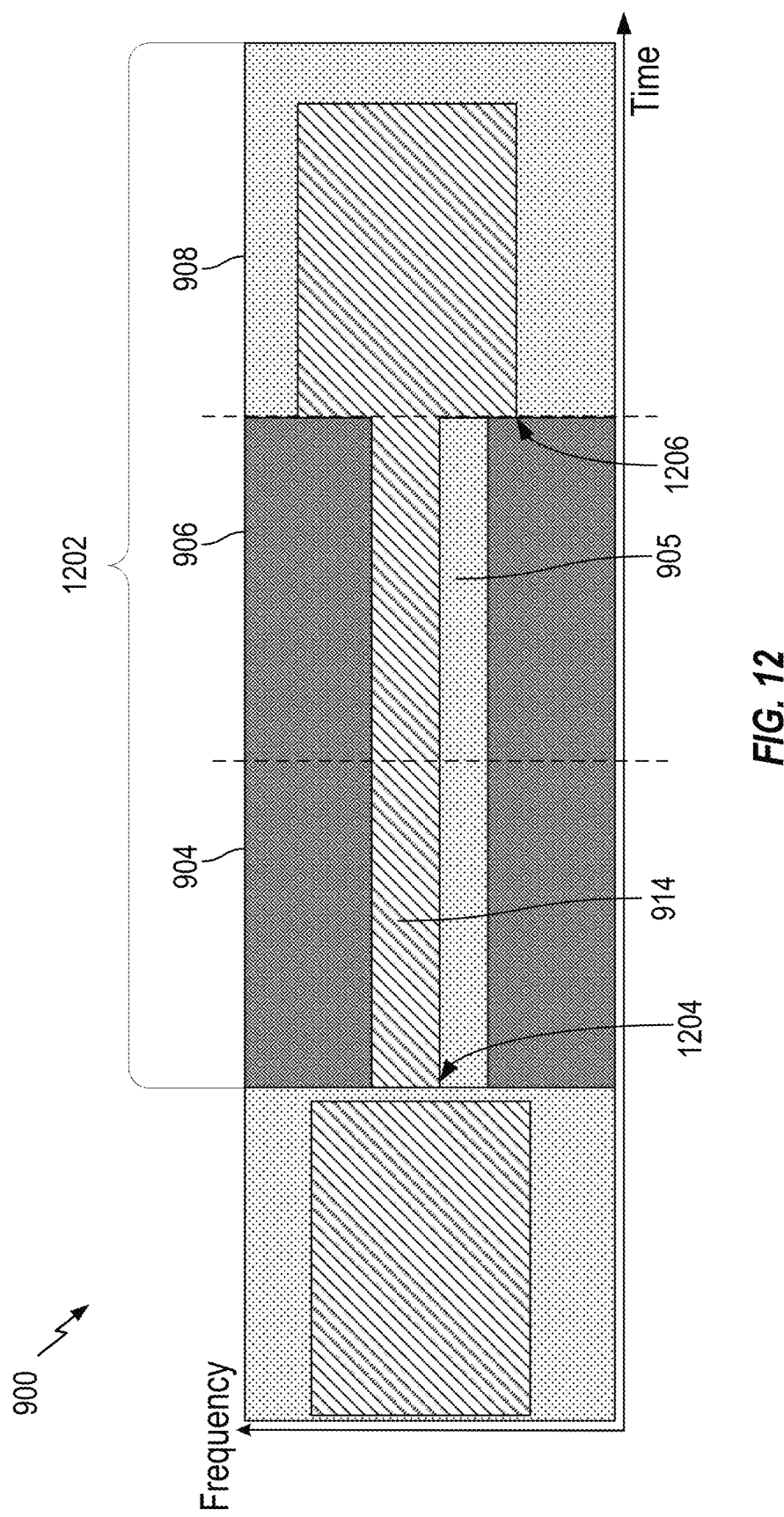
FIG. 12 illustrates an aggregating slot having a mix of non-full duplex slots and full duplex slots.

In some cases, the aggregated slot may include a mix between FD and non-FD slots. For example, as shown in FIG. 12, the UE 804 may merge the first FD slot 904, the second FD slot 906, and the second UL slot 908 into one aggregated slot 1202 in which the PUSCH repetition 914 may be transmitted. In such cases, the transmission of the PUSCH repetition 914 may be extended in the time domain across the first FD slot 904, the second FD slot 906, and the second UL slot 908 of the aggregated slot 1202.

Additionally, in some cases, due to the UL subband of the second UL slot 908 being greater than the UL subband of the first FD slot 904 and second FD slot 906, an FDRA for the PUSCH repetition 914 within the second UL slot 908 of the aggregated slot 1202 may be different (e.g., larger) from an FDRA for the PUSCH repetition 914 within the first FD slot 904 and second FD slot 906 of the aggregated slot 1202. As a result, a portion of the PUSCH repetition 914 transmitted within the second UL slot 908 of the aggregated slot 1202 may be extended in the frequency domain. In other words, the PUSCH repetition 914 may be transmitted using a first number of RBs when transmitted in the first FD slot 904 and second FD slot 906 of the aggregated slot 1202. In contrast, the PUSCH repetition 914 may be transmitted using a second number of RBs in the second UL slot 908 of the aggregated slot 1202, where the second number of RBs is larger than the first number of RBs.

Further, in some cases, a starting RB for the PUSCH repetition 914 within the first FD slot 904 and second FD slot 906 of the aggregated slot may be different from a second starting RB for the PUSCH repetition 914 within the second UL slot 908 within the aggregated slot. For example, as shown in FIG. 12, a first portion of the PUSCH repetition 914 transmitted within the first FD slot 904 of the aggregated slot 1202 is associated with a first starting RB 1204 while a second portion of the PUSCH repetition 914 transmitted within the second UL slot 908 of the aggregated slot 1202 is associated with second starting RB 1206 different from the first starting RB 1204.

In some cases, the UE 804 may decide whether to merge two slots based on certain rules. For example, in some cases, a number of the one or more additional slots allowed to be merged with the first FD slot may be subject to a maximum threshold. In some cases, the UE 804 may receive an indication of this maximum threshold from the network entity 802, for example, in RRC signaling as shown at 840 in FIG. 8. In some cases, the maximum threshold may be included in the scheduling information transmitted by the network entity 802 in step 810 of FIG. 8. For example, assuming that the maximum threshold is three, the UE 804 may be prevented from merging more than three additional slots with the first FD slot. In some cases the maximum threshold may be indicated in relation to a total number of slots to be merged (e.g., including the first FD slot).

Figure 13:
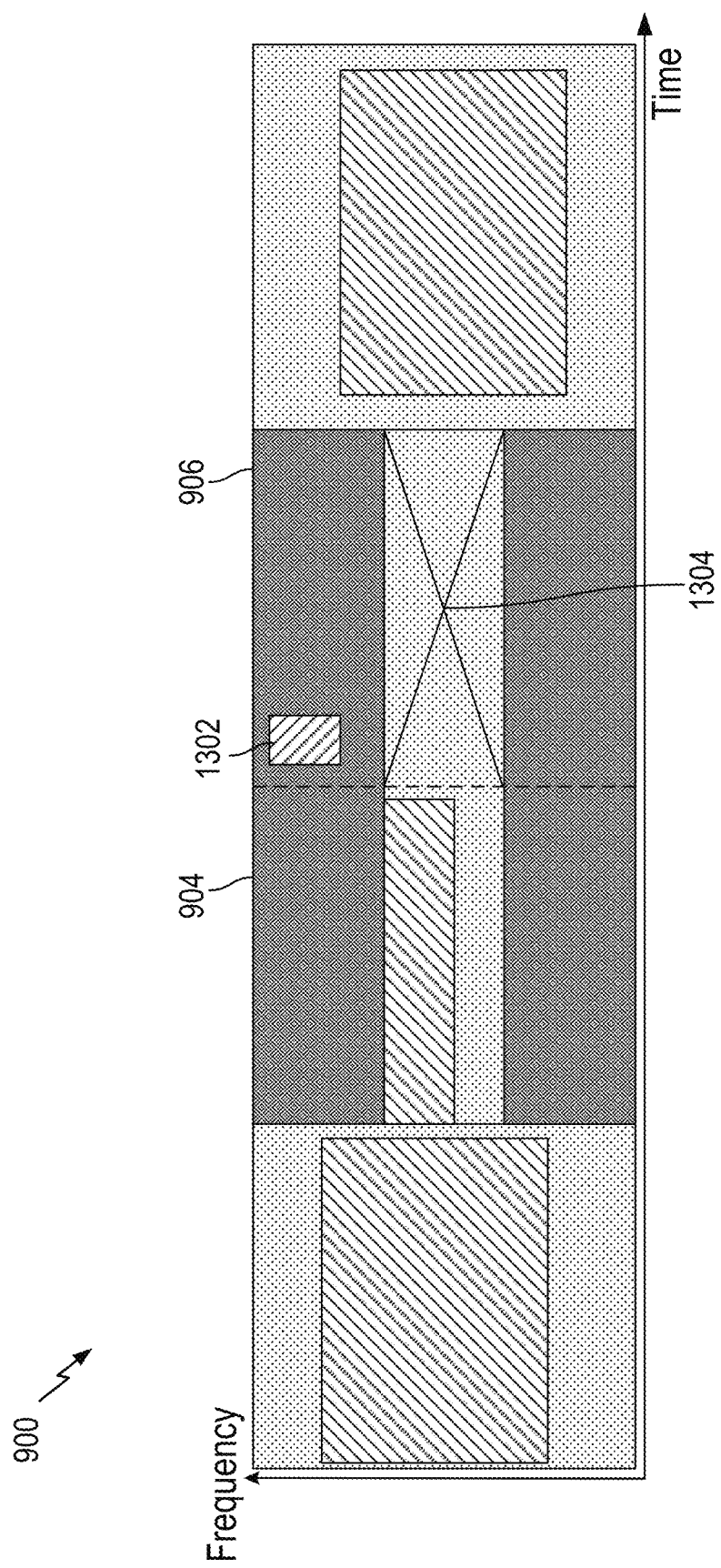
FIG. 13 illustrates a scenario in which the user equipment is not permitted to merge two slots to form an aggregated slot.

In some cases, the one or more rules may specify that the UE 804 may not merge any slots in which an UL grant is scheduled. As illustrated in FIG. 13, in some cases a UL grant 1302 is scheduled to be transmitted by the network entity 802 in the DL subband 907 of the second FD slot 906. In such cases, the second FD slot 906 may not be merged with the first FD slot 904 as indicated at 1304.

In some cases, whether the UE 804 is permitted to include a slot of the plurality of slots in the one or more additional slots that are merged with the first FD slot depends on an amount of frequency resources of a portion of the first UL channel repetition scheduled to occur in the DL subband and a threshold amount of frequency resources. In other words, for example, with reference to FIG. 9, whether the UE 804 is permitted to merge the second FD slot 906 with the first FD slot 904 depends on an amount of resources associated with the portion of the PUSCH repetition 914 scheduled to occur within the DL subband 907.

For example, in some cases, the one or more rules may specify that when the amount of frequency resources of the portion of the PUSCH repetition 914 scheduled to occur in the DL subband 907 is greater than or equal to the threshold amount of frequency resources, the UE 804 may be permitted to include the second FD slot 906 as one of the one or more additional slots merged with the first FD slot 904. However, when the amount of frequency resources of the portion of the PUSCH repetition 914 scheduled to occur in the DL subband 907 is not greater than or equal to the threshold amount of frequency resources, the UE 804 may not be permitted to include the second FD slot 906 as one of the one or more additional slots merged with the first FD slot 904. In such cases, taking the one or more actions to transmit the first UL channel repetition in step 820 of FIG. 8 may include puncturing the portion of the PUSCH repetition 914 scheduled to occur in the DL subband 907 of the first FD slot 904.

Example Operations of a User Equipment

FIG. 14 shows a method 1400 for wireless communication by a UE, such as UE 104 of FIGS. 1 and 3.

Method 1400 begins at 1402 with receiving scheduling information from a network entity. In some cases, the scheduling information schedules transmission of a first uplink (UL) channel repetition of a plurality of UL channel repetitions in a first full duplex (FD) slot of a plurality of slots. In some cases, the first UL channel repetition is associated with one or more time domain resource allocations (TDRAs) and one or more frequency domain resource allocations (FDRAs). In some cases, the first FD slot comprises an UL subband for UL transmissions and a downlink (DL) subband for DL transmissions. In some cases, based on the one or more FDRAs associated with the first UL channel repetition, a portion of the first UL channel repetition is scheduled to occur in the DL subband of the first FD slot.

Thereafter, in step 1404, the UE takes one or more actions to transmit the first UL channel repetition based on the scheduling information.

In some cases, based on the portion of the first UL channel scheduled to occur in the DL subband of the first FD slot, taking the one or more actions to transmit the first UL channel repetition in step 1404 comprises merging one or more additional slots with the first FD slot to form an aggregated slot comprising the UL subband and the DL subband and extending transmission of the first UL channel repetition in a time domain such that the first UL channel repetition, including the portion of the first UL channel scheduled to occur in the DL subband of the first FD slot, is transmitted within the UL subband of the aggregated slot.

In some cases, when the one or more additional slots are merged with the first FD slot, the one or more additional slots are not available for transmitting other repetitions of the plurality of UL channel repetitions.

In some cases, when the one or more additional slots are merged with the first FD slot: one or more slot boundaries between the one or more additional slots and the first FD slot are removed, and the first UL channel repetition is transmitted as one continuous repetition in the aggregated slot.

In some cases, the one or more TDRAs associated with the first UL channel repetition comprises one TDRA for the aggregated slot.

In some cases, the one or more TDRAs associated with the first UL channel repetition comprises a plurality of TDRAs, one TDRA for each slot of the aggregated slot, and each TDRA for each slot of the aggregated slot is the same.

In some cases, the one or more TDRAs associated with the first UL channel repetition comprises a plurality of TDRAs, one TDRA for each slot of the aggregated slot, and each TDRA for each slot of the aggregated slot is different.

In some cases, the one or more additional slots comprise at least one of: a second FD slot, or a non-FD slot.

In some cases, the one or more additional slots comprise a non-FD slot, a first portion of the first UL channel repetition transmitted within the first FD slot of the aggregated slot is associated with a first FDRA of the one or more FDRAs, and a second portion of the first UL channel repetition transmitted within the non-FD slot of the aggregated slot is associated with second FDRA of the one or more FDRAs different from the first FDRA.

In some cases, a first portion of the first UL channel repetition transmitted within the first FD slot of the aggregated slot is associated with a first starting RB and a second portion of the first UL channel repetition transmitted within one or more of the additional slots of the aggregated slot is associated with second starting RB different from the first starting RB.

In some cases, a number of the one or more additional slots allowed to be merged with the first FD slot is subject to a maximum threshold.

In some cases, the method 1400 further includes receiving an indication of the maximum threshold from the network entity.

In some cases, one or more additional slots do not include any slots of the plurality of slots that include an UL grant.

In some cases, whether a slot of the plurality of slots is included in the one or more additional slots that are merged with the first FD slot depends on an amount of frequency resources of a portion of the first UL channel repetition scheduled to occur in the DL subband and a threshold amount of frequency resources. In some cases, the slot is included in the one or more additional slots when the amount of frequency resources of the portion of the first UL channel repetition scheduled to occur in the DL subband is greater than or equal to the threshold amount of frequency resources. In some cases, when the amount of frequency resources of the portion of the first UL channel repetition scheduled to occur in the DL subband is not greater than or equal to the threshold amount of frequency resources, taking the one or more actions to transmit the first UL channel repetition in step 1420 comprises puncturing the portion of the first UL channel repetition scheduled to occur in the DL subband.

Figure 16:
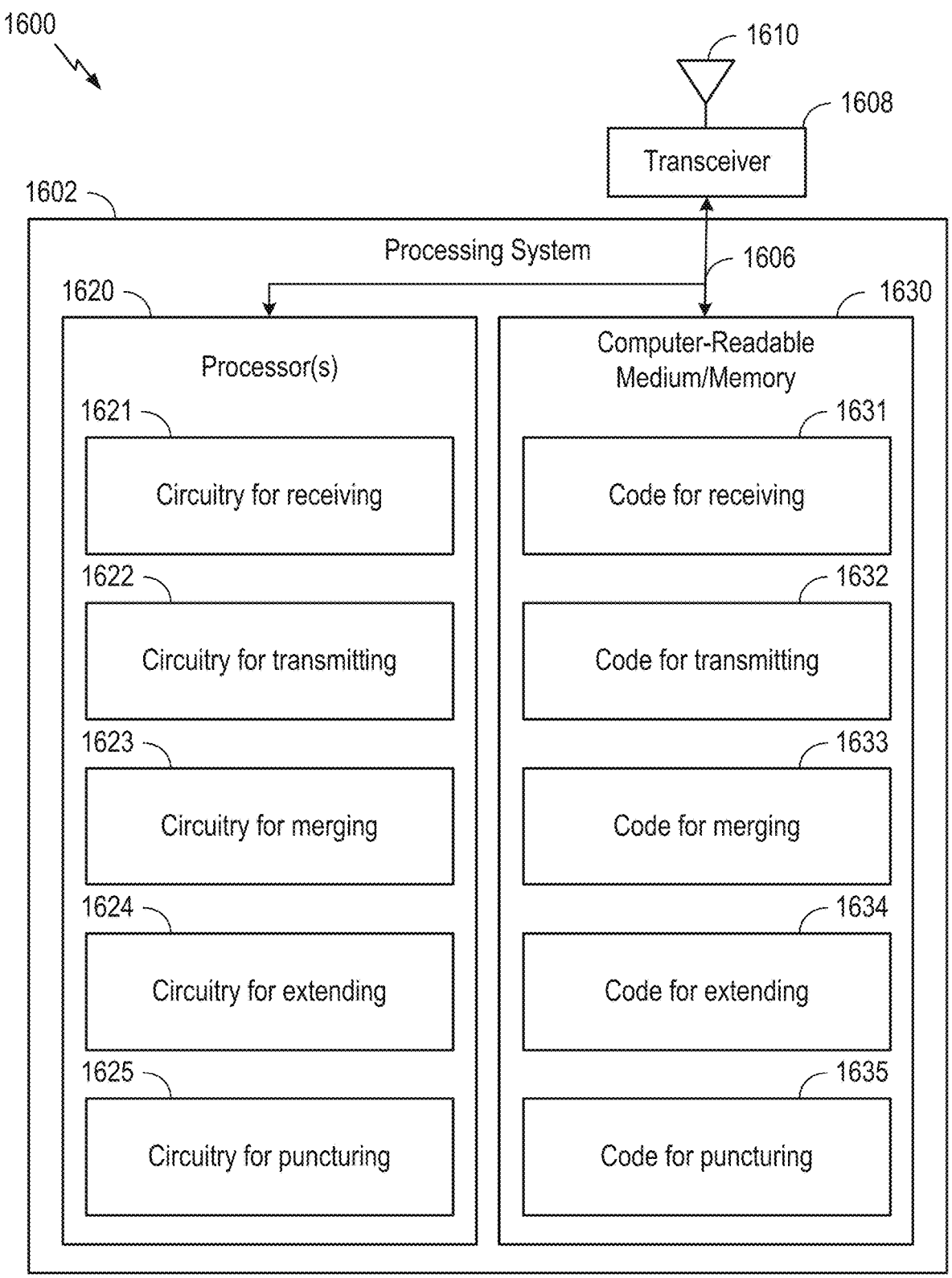
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Operations of a Network Entity

FIG. 15 shows a method 1500 for wireless communication by a network entity, such as BS 102 of FIGS. 1 and 3, or a disaggregated base station as discussed with respect to FIG. 2.

Method 1500 begins at 1510 with transmitting scheduling information to a user equipment (UE). In some cases, the scheduling information schedules transmission of a first uplink (UL) channel repetition of a plurality of UL channel repetitions in a first full duplex (FD) slot of a plurality of slots. In some cases, the first UL channel repetition is associated with one or more time domain resource allocations (TDRAs) and one or more frequency domain resource allocations (FDRAs). In some cases, the first FD slot comprises an UL subband for UL transmissions and a downlink (DL) subband for DL transmissions. In some cases, based on the one or more FDRAs associated with the first UL channel repetition, a portion of the first UL channel repetition is scheduled to occur in the DL subband of the first FD slot.

Thereafter, in step 1520, the network entity takes one or more actions to receive the first UL channel repetition based on the scheduling information.

In some cases, based on the portion of the first UL channel scheduled to occur in the DL subband of the first FD slot, taking the one or more actions to receive the first UL channel repetition comprises: merging one or more additional slots with the first FD slot to form an aggregated slot comprising the UL subband and the DL subband and extending reception of the first UL channel repetition in a time domain such that the first UL channel repetition, including the portion of the first UL channel scheduled to occur in the DL subband of the first FD slot, is received within the UL subband of the aggregated slot.

In some cases, when the one or more additional slots are merged with the first FD slot, the one or more additional slots are not available for receiving other repetitions of the plurality of UL channel repetitions.

In some cases, when the one or more additional slots are merged with the first FD slot: one or more slot boundaries between the one or more additional slots and the first FD slot are removed, and the first UL channel repetition is received as one continuous repetition in the aggregated slot.

In some cases, the one or more TDRAs associated with the first UL channel repetition comprises one TDRA for the aggregated slot.

In some cases, the one or more TDRAs associated with the first UL channel repetition comprises a plurality of TDRAs, one TDRA for each slot of the aggregated slot, and each TDRA for each slot of the aggregated slot is the same.

In some cases, the one or more TDRAs associated with the first UL channel repetition comprises a plurality of TDRAs, one TDRA for each slot of the aggregated slot, and each TDRA for each slot of the aggregated slot is different.

In some cases, the one or more additional slots comprise at least one of: a second FD slot, or a non-FD slot.

In some cases, the one or more additional slots comprise a non-FD slot, a first portion of the first UL channel repetition transmitted within the first FD slot of the aggregated slot is associated with a first FDRA of the one or more FDRAs, and a second portion of the first UL channel repetition received within the non-FD slot of the aggregated slot is associated with second FDRA of the one or more FDRAs different from the first FDRA.

In some cases, a first portion of the first UL channel repetition received within the first FD slot of the aggregated slot is associated with a first starting RB, and a second portion of the first UL channel repetition received within one or more of the additional slots of the aggregated slot is associated with second starting RB different from the first starting RB.

In some cases, a number of the one or more additional slots allowed to be merged with the first FD slot is subject to a maximum threshold.

In some cases, the method 1500 further includes transmitting an indication of the maximum threshold to the UE.

In some cases, the one or more additional slots do not include any slots of the plurality of slots that include an UL grant.

In some cases, whether a slot of the plurality of slots is included in the one or more additional slots that are merged with the first FD slot depends on an amount of frequency resources of a portion of the first UL channel repetition scheduled to occur in the DL subband and a threshold amount of frequency resources. In some cases, the slot is included in the one or more additional slots when the amount of frequency resources of the portion of the first UL channel repetition scheduled to occur in the DL subband is greater than or equal to the threshold amount of frequency resources. In some cases, when the amount of frequency resources of the portion of the first UL channel repetition scheduled to occur in the DL subband is not greater than or equal to the threshold amount of frequency resources, taking the one or more actions to receive the first UL channel repetition in step 1520 comprises puncturing the portion of the first UL channel repetition scheduled to occur in the DL subband.

Figure 17:
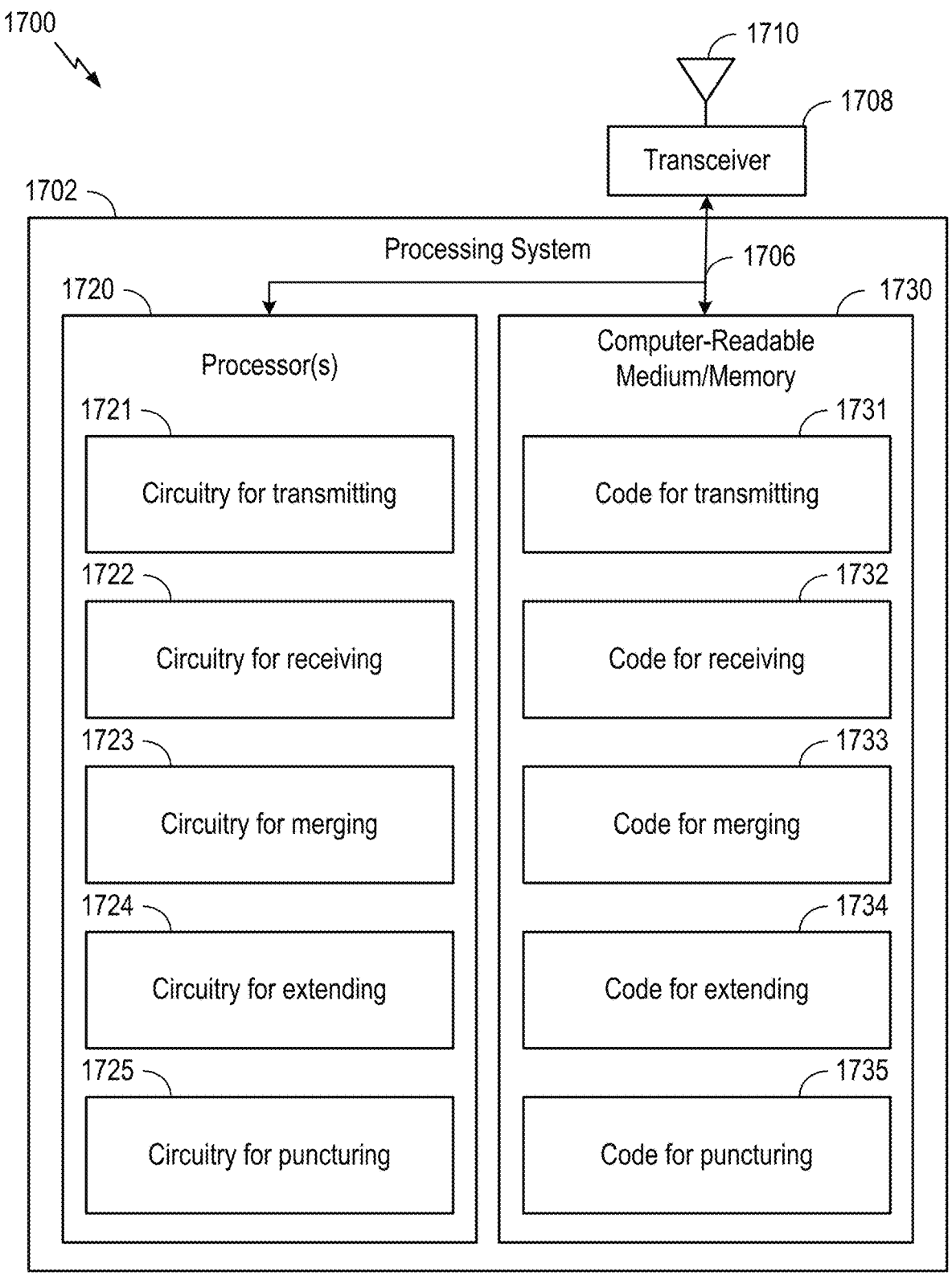
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Communication Devices

FIG. 16 depicts aspects of an example communications device 1600. In some aspects, communications device 1600 is a user equipment, such as UE 104 described above with respect to FIGS. 1 and 3.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes one or more processors 1620. In various aspects, the one or more processors 1620 may be representative of one or more of receive processor 358, transmit processor 364, TX MIMO processor 366, and/or controller/processor 380, as described with respect to FIG. 3. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the method 1400 described with respect to FIG. 14, or any aspect related to it. Note that reference to a processor performing a function of communications device 1600 may include one or more processors performing that function of communications device 1600.

In the depicted example, computer-readable medium/memory 1630 stores code (e.g., executable instructions) for receiving 1631, code for transmitting 1632, code for merging 1633, code for extending 1634, and code for puncturing 1635. Processing of the code 1631-1635 may cause the communications device 1600 to perform the method 1400 described with respect to FIG. 14, or any aspect related to it.

The one or more processors 1620 include circuitry configured to implement (e.g., execute) the code stored in the computer-readable medium/memory 1630, including circuitry for receiving 1621, circuitry for transmitting 1622, circuitry for merging 1623, circuitry for extending 1624, and circuitry for puncturing 1625. Processing with circuitry 1621-1625 may cause the communications device 1600 to perform the method 1400 described with respect to FIG. 14, or any aspect related to it.

Various components of the communications device 1600 may provide means for performing the method 1400 described with respect to FIG. 14, or any aspect related to it. For example, means for transmitting, sending or outputting for transmission may include the transceivers 354 and/or antenna(s) 352 of the UE 104 illustrated in FIG. 3 and/or transceiver 1608 and antenna 1610 of the communications device 1600 in FIG. 16. Means for receiving or obtaining may include the transceivers 354 and/or antenna(s) 352 of the UE 104 illustrated in FIG. 3 and/or transceiver 1608 and antenna 1610 of the communications device 1600 in FIG. 16. Means for merging, means for extending, and/or means for puncturing may include one or more processors, such as transmit processor 364, the controller/processor 380, and/or the receive processor 358.

FIG. 17 depicts aspects of an example communications device.

The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes one or more processors 1720. In various aspects, one or more processors 1720 may be representative of one or more of receive processor 338, transmit processor 320, TX MIMO processor 330, and/or controller/processor 340, as described with respect to FIG. 3. The one or more processors 1720 are coupled to a computer-readable medium/memory 1730 via a bus 1706. In certain aspects, the computer-readable medium/memory 1730 is configured to store instructions (e.g., computer-executable code) that when executed by the one or more processors 1720, cause the one or more processors 1720 to perform the method 1500 described with respect to FIG. 15, or any aspect related to it. Note that reference to a processor of communications device 1700 performing a function may include one or more processors of communications device 1700 performing that function.

In the depicted example, the computer-readable medium/memory 1730 stores code (e.g., executable instructions) for transmitting 1731, code for receiving 1732, code for merging 1733, code for extending 1734, and code for puncturing 1735. Processing of the code 1731-1735 may cause the communications device 1700 to perform the method 1500 described with respect to FIG. 15, or any aspect related to it.

The one or more processors 1720 include circuitry configured to implement (e.g., execute) the code stored in the computer-readable medium/memory 1730, including circuitry for transmitting 1721, circuitry for receiving 1722, circuitry for merging 1723, circuitry for extending 1724, and circuitry for puncturing 1725. Processing with circuitry 1721-1725 may cause the communications device 1700 to perform the method 1500 as described with respect to FIG. 15, or any aspect related to it.

Various components of the communications device 1700 may provide means for performing the method 1500 as described with respect to FIG. 15, or any aspect related to it. Means for transmitting, sending or outputting for transmission may include the transceivers 332 and/or antenna(s) 334 of the BS 102 illustrated in FIG. 3 and/or transceiver 1708 and antenna 1710 of the communications device 1700 in FIG. 17. Means for receiving or obtaining may include the transceivers 332 and/or antenna(s) 334 of the BS 102 illustrated in FIG. 3 and/or transceiver 1708 and antenna 1710 of the communications device 1700 in FIG. 17. Means for merging, means for extending, and/or means for puncturing may include one or more processors, such as transmit processor 320, the controller/processor 340, and/or the receive processor 338.

Example Clauses

Implementation examples are described in the following numbered clauses:

Clause 1: A method for wireless communication by a user equipment (UE), comprising: receiving scheduling information from a network entity, wherein: the scheduling information schedules transmission of a first uplink (UL) channel repetition of a plurality of UL channel repetitions in a first full duplex (FD) slot of a plurality of slots, the first UL channel repetition is associated with one or more time domain resource allocations (TDRAs) and one or more frequency domain resource allocations (FDRAs), the first FD slot comprises an UL subband for UL transmissions and a downlink (DL) subband for DL transmissions, and based on the one or more FDRAs associated with the first UL channel repetition, a portion of the first UL channel repetition is scheduled to occur in the DL subband of the first FD slot; and taking one or more actions to transmit the first UL channel repetition based on the scheduling information.

Clause 2: The method of Clause 1, wherein, based on the portion of the first UL channel scheduled to occur in the DL subband of the first FD slot, taking the one or more actions to transmit the first UL channel repetition comprises: merging one or more additional slots with the first FD slot to form an aggregated slot comprising the UL subband and the DL subband, and extending transmission of the first UL channel repetition in a time domain such that the first UL channel repetition, including the portion of the first UL channel scheduled to occur in the DL subband of the first FD slot, is transmitted within the UL subband of the aggregated slot.

Clause 3: The method of Clause 2, wherein, when the one or more additional slots are merged with the first FD slot, the one or more additional slots are not available for transmitting other repetitions of the plurality of UL channel repetitions.

Clause 4: The method of any one of Clauses 2-3, wherein, when the one or more additional slots are merged with the first FD slot: one or more slot boundaries between the one or more additional slots and the first FD slot are removed, and the first UL channel repetition is transmitted as one continuous repetition in the aggregated slot.

Clause 5: The method of any one of Clauses 2-4, wherein the one or more TDRAs associated with the first UL channel repetition comprises one TDRA for the aggregated slot.

Clause 6: The method of any one of Clauses 2-4, wherein: the one or more TDRAs associated with the first UL channel repetition comprises a plurality of TDRAs, one TDRA for each slot of the aggregated slot, and each TDRA for each slot of the aggregated slot is the same.

Clause 7: The method of any one of Clauses 2-4, wherein: the one or more TDRAs associated with the first UL channel repetition comprises a plurality of TDRAs, one TDRA for each slot of the aggregated slot, and each TDRA for each slot of the aggregated slot is different.

Clause 8: The method of any one of Clauses 2-7, wherein the one or more additional slots comprise at least one of: a second FD slot, or a non-FD slot.

Clause 9: The method of any one of Clauses 2-8, wherein: the one or more additional slots comprise a non-FD slot, a first portion of the first UL channel repetition transmitted within the first FD slot of the aggregated slot is associated with a first FDRA of the one or more FDRAs, and a second portion of the first UL channel repetition transmitted within the non-FD slot of the aggregated slot is associated with second FDRA of the one or more FDRAs different from the first FDRA.

Clause 10: The method of any one of Clauses 2-9, wherein at least one of: a first portion of the first UL channel repetition transmitted within the first FD slot of the aggregated slot is associated with a first starting RB, and a second portion of the first UL channel repetition transmitted within one or more of the additional slots of the aggregated slot is associated with second starting RB different from the first starting RB.

Clause 11: The method of any one of Clauses 2-10, wherein a number of the one or more additional slots allowed to be merged with the first FD slot is subject to a maximum threshold.

Clause 12: The method of Clause 11, further comprising receiving an indication of the maximum threshold from the network entity.

Clause 13: The method of any one of Clauses 2-12, wherein the one or more additional slots do not include any slots of the plurality of slots that include an UL grant.

Clause 14: The method of any one of Clauses 2-13, wherein: whether a slot of the plurality of slots is included in the one or more additional slots that are merged with the first FD slot depends on an amount of frequency resources of a portion of the first UL channel repetition scheduled to occur in the DL subband and a threshold amount of frequency resources, the slot is included in the one or more additional slots when the amount of frequency resources of the portion of the first UL channel repetition scheduled to occur in the DL subband is greater than or equal to the threshold amount of frequency resources, and when the amount of frequency resources of the portion of the first UL channel repetition scheduled to occur in the DL subband is not greater than or equal to the threshold amount of frequency resources, taking the one or more actions to transmit the first UL channel repetition comprises puncturing the portion of the first UL channel repetition scheduled to occur in the DL subband.

Clause 15: A method for wireless communication by a network entity, comprising: transmitting scheduling information to a user equipment (UE), wherein: the scheduling information schedules transmission of a first uplink (UL)

channel repetition of a plurality of UL channel repetitions in a first full duplex (FD) slot of a plurality of slots, the first UL channel repetition is associated with one or more time domain resource allocations (TDRAs) and one or more frequency domain resource allocations (FDRAs), the first FD slot comprises an UL subband for UL transmissions and a downlink (DL) subband for DL transmissions, and based on the one or more FDRAs associated with the first UL channel repetition, a portion of the first UL channel repetition is scheduled to occur in the DL subband of the first FD slot; and taking one or more actions to receive the first UL channel repetition based on the scheduling information.

Clause 16: The method of Clause 15, wherein, based on the portion of the first UL channel scheduled to occur in the DL subband of the first FD slot, taking the one or more actions to receive the first UL channel repetition comprises: merging one or more additional slots with the first FD slot to form an aggregated slot comprising the UL subband and the DL subband, and extending reception of the first UL channel repetition in a time domain such that the first UL channel repetition, including the portion of the first UL channel scheduled to occur in the DL subband of the first FD slot, is received within the UL subband of the aggregated slot.

Clause 17: The method of Clause 16, wherein, when the one or more additional slots are merged with the first FD slot, the one or more additional slots are not available for receiving other repetitions of the plurality of UL channel repetitions.

Clause 18: The method of any one of Clauses 16-17, wherein, when the one or more additional slots are merged with the first FD slot: one or more slot boundaries between the one or more additional slots and the first FD slot are removed, and the first UL channel repetition is received as one continuous repetition in the aggregated slot.

Clause 19: The method of any one of Clauses 16-18, wherein the one or more TDRAs associated with the first UL channel repetition comprises one TDRA for the aggregated slot.

Clause 20: The method of any one of Clauses 16-18, wherein: the one or more TDRAs associated with the first UL channel repetition comprises a plurality of TDRAs, one TDRA for each slot of the aggregated slot, and each TDRA for each slot of the aggregated slot is the same.

Clause 21: The method of any one of Clauses 16-18, wherein: the one or more TDRAs associated with the first UL channel repetition comprises a plurality of TDRAs, one TDRA for each slot of the aggregated slot, and each TDRA for each slot of the aggregated slot is different.

Clause 22: The method of any one of Clauses 16-21, wherein the one or more additional slots comprise at least one of: a second FD slot, or a non-FD slot.

Clause 23: The method of any one of Clauses 16-22, wherein: the one or more additional slots comprise a non-FD slot, a first portion of the first UL channel repetition transmitted within the first FD slot of the aggregated slot is associated with a first FDRA of the one or more FDRAs, and a second portion of the first UL channel repetition received within the non-FD slot of the aggregated slot is associated with second FDRA of the one or more FDRAs different from the first FDRA.

Clause 24: The method of any one of Clauses 16-23, wherein at least one of: a first portion of the first UL channel repetition received within the first FD slot of the aggregated slot is associated with a first starting RB, and a second portion of the first UL channel repetition received within one or more of the additional slots of the aggregated slot is associated with second starting RB different from the first starting RB.

Clause 25: The method of any one of Clauses 16-24, wherein a number of the one or more additional slots allowed to be merged with the first FD slot is subject to a maximum threshold.

Clause 26: The method of Clause 25, further comprising transmitting an indication of the maximum threshold to the UE.

Clause 27: The method of any one of Clauses 16-26, wherein the one or more additional slots do not include any slots of the plurality of slots that include an UL grant.

Clause 28: The method of any one of Clauses 16-27, wherein: whether a slot of the plurality of slots is included in the one or more additional slots that are merged with the first FD slot depends on an amount of frequency resources of a portion of the first UL channel repetition scheduled to occur in the DL subband and a threshold amount of frequency resources, the slot is included in the one or more additional slots when the amount of frequency resources of the portion of the first UL channel repetition scheduled to occur in the DL subband is greater than or equal to the threshold amount of frequency resources, and when the amount of frequency resources of the portion of the first UL channel repetition scheduled to occur in the DL subband is not greater than or equal to the threshold amount of frequency resources, taking the one or more actions to receive the first UL channel repetition comprises puncturing the portion of the first UL channel repetition scheduled to occur in the DL subband.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving scheduling information from a network entity, wherein:
      the scheduling information schedules transmission of a first uplink (UL) channel repetition of a plurality of UL channel repetitions in a first full duplex (FD) slot of a plurality of slots,
      the first UL channel repetition is associated with one or more time domain resource allocations (TDRAs) and one or more frequency domain resource allocations (FDRAs),
      the first FD slot comprises an UL subband for UL transmissions and a downlink (DL) subband for DL transmissions, and
      based on the one or more FDRAs associated with the first UL channel repetition, a portion of the first UL channel repetition is scheduled to occur in the DL subband of the first FD slot; and
   taking one or more actions to transmit the first UL channel repetition based on the scheduling information.

2. The method of claim 1, wherein, based on the portion of the first UL channel scheduled to occur in the DL subband of the first FD slot, taking the one or more actions to transmit the first UL channel repetition comprises:
   merging one or more additional slots with the first FD slot to form an aggregated slot comprising the UL subband and the DL subband, and
   extending transmission of the first UL channel repetition in a time domain such that the first UL channel repetition, including the portion of the first UL channel scheduled to occur in the DL subband of the first FD slot, is transmitted within the UL subband of the aggregated slot.

3. The method of claim 2, wherein, when the one or more additional slots are merged with the first FD slot, the one or more additional slots are not available for transmitting other repetitions of the plurality of UL channel repetitions.

4. The method of claim 2, wherein, when the one or more additional slots are merged with the first FD slot:
   one or more slot boundaries between the one or more additional slots and the first FD slot are removed, and
   the first UL channel repetition is transmitted as one continuous repetition in the aggregated slot.

5. The method of claim 2, wherein the one or more TDRAs associated with the first UL channel repetition comprises one TDRA for the aggregated slot.

6. The method of claim 2, wherein:
   the one or more TDRAs associated with the first UL channel repetition comprises a plurality of TDRAs, one TDRA for each slot of the aggregated slot, and
   each TDRA for each slot of the aggregated slot is the same.

7. The method of claim 2, wherein:
   the one or more TDRAs associated with the first UL channel repetition comprises a plurality of TDRAs, one TDRA for each slot of the aggregated slot, and
   each TDRA for each slot of the aggregated slot is different.

8. The method of claim 2, wherein the one or more additional slots comprise at least one of:
   a second FD slot, or
   a non-FD slot.

9. The method of claim 2, wherein:
the one or more additional slots comprise a non-FD slot,
a first portion of the first UL channel repetition transmitted within the first FD slot of the aggregated slot is associated with a first FDRA of the one or more FDRAs, and
a second portion of the first UL channel repetition transmitted within the non-FD slot of the aggregated slot is associated with second FDRA of the one or more FDRAs different from the first FDRA.

10. The method of claim 2, wherein at least one of:
a first portion of the first UL channel repetition transmitted within the first FD slot of the aggregated slot is associated with a first starting RB, and
a second portion of the first UL channel repetition transmitted within one or more of the additional slots of the aggregated slot is associated with second starting RB different from the first starting RB.

11. The method of claim 2, wherein a number of the one or more additional slots allowed to be merged with the first FD slot is subject to a maximum threshold.

12. The method of claim 11, further comprising receiving an indication of the maximum threshold from the network entity.

13. The method of claim 2, wherein the one or more additional slots do not include any slots of the plurality of slots that include an UL grant.

14. The method of claim 2, wherein:
whether a slot of the plurality of slots is included in the one or more additional slots that are merged with the first FD slot depends on an amount of frequency resources of a portion of the first UL channel repetition scheduled to occur in the DL subband and a threshold amount of frequency resources,
the slot is included in the one or more additional slots when the amount of frequency resources of the portion of the first UL channel repetition scheduled to occur in the DL subband is greater than or equal to the threshold amount of frequency resources, and
when the amount of frequency resources of the portion of the first UL channel repetition scheduled to occur in the DL subband is not greater than or equal to the threshold amount of frequency resources, taking the one or more actions to transmit the first UL channel repetition comprises puncturing the portion of the first UL channel repetition scheduled to occur in the DL subband.

15. A user equipment (UE) for wireless communication, comprising:
memory comprising executable instructions; and
a processor configured to execute the executable instructions and cause the apparatus to:
receive scheduling information from a network entity, wherein:
the scheduling information schedules transmission of a first uplink (UL) channel repetition of a plurality of UL channel repetitions in a first full duplex (FD) slot of a plurality of slots,
the first UL channel repetition is associated with one or more time domain resource allocations (TDRAs) and one or more frequency domain resource allocations (FDRAs),
the first FD slot comprises an UL subband for UL transmissions and a downlink (DL) subband for DL transmissions, and
based on the one or more FDRAs associated with the first UL channel repetition, a portion of the first UL channel repetition is scheduled to occur in the DL subband of the first FD slot; and
take one or more actions to transmit the first UL channel repetition based on the scheduling information.

16. The UE of claim 15, wherein, in order to take the one or more actions to transmit the first UL channel repetition based on the portion of the first UL channel scheduled to occur in the DL subband of the first FD slot, the processor is configured to cause the UE to: merge one or more additional slots with the first FD slot to form an aggregated slot comprising the UL subband and the DL subband, and extend transmission of the first UL channel repetition in a time domain such that the first UL channel repetition, including the portion of the first UL channel scheduled to occur in the DL subband of the first FD slot, is transmitted within the UL subband of the aggregated slot.

17. The UE of claim 16, wherein, when the one or more additional slots are merged with the first FD slot, the one or more additional slots are not available for transmitting other repetitions of the plurality of UL channel repetitions.

18. The UE of claim 16, wherein, when the one or more additional slots are merged with the first FD slot: one or more slot boundaries between the one or more additional slots and the first FD slot are removed, and the first UL channel repetition is transmitted as one continuous repetition in the aggregated slot.

19. The UE of claim 16, wherein the one or more TDRAs associated with the first UL channel repetition comprises one TDRA for the aggregated slot.

20. The UE of claim 16, wherein: the one or more TDRAs associated with the first UL channel repetition comprises a plurality of TDRAs, one TDRA for each slot of the aggregated slot, and each TDRA for each slot of the aggregated slot is the same.

21. The UE of claim 16, wherein: the one or more TDRAs associated with the first UL channel repetition comprises a plurality of TDRAs, one TDRA for each slot of the aggregated slot, and each TDRA for each slot of the aggregated slot is different.

22. The UE of claim 16, wherein the one or more additional slots comprise at least one of: a second FD slot, or a non-FD slot.

23. The UE of claim 16, wherein: the one or more additional slots comprise a non-FD slot, a first portion of the first UL channel repetition transmitted within the first FD slot of the aggregated slot is associated with a first FDRA of the one or more FDRAs, and a second portion of the first UL channel repetition transmitted within the non-FD slot of the aggregated slot is associated with second FDRA of the one or more FDRAs different from the first FDRA.

24. The UE of claim 16, wherein at least one of: a first portion of the first UL channel repetition transmitted within the first FD slot of the aggregated slot is associated with a first starting RB, and a second portion of the first UL channel repetition transmitted within one or more of the additional slots of the aggregated slot is associated with second starting RB different from the first starting RB.

25. The UE of claim 16, wherein a number of the one or more additional slots allowed to be merged with the first FD slot is subject to a maximum threshold.

26. The UE of claim 25, where the processor is further configured to cause the UE to receive an indication of the maximum threshold from the network entity.

27. The UE of claim 16, wherein the one or more additional slots do not include any slots of the plurality of slots that include an UL grant.

28. The UE of claim 16, wherein: whether a slot of the plurality of slots is included in the one or more additional slots that are merged with the first FD slot depends on an amount of frequency resources of a portion of the first UL channel repetition scheduled to occur in the DL subband and a threshold amount of frequency resources, the slot is included in the one or more additional slots when the amount of frequency resources of the portion of the first UL channel repetition scheduled to occur in the DL subband is greater than or equal to the threshold amount of frequency resources, and when the amount of frequency resources of the portion of the first UL channel repetition scheduled to occur in the DL subband is not greater than or equal to the threshold amount of frequency resources, in order to take the one or more actions to transmit the first UL channel repetition, the processor is configured to cause the UE to puncture the portion of the first UL channel repetition scheduled to occur in the DL subband.

29. An apparatus, comprising:
  means for receiving scheduling information from a network entity, wherein:
    the scheduling information schedules transmission of a first uplink (UL) channel repetition of a plurality of UL channel repetitions in a first full duplex (FD) slot of a plurality of slots,
    the first UL channel repetition is associated with one or more time domain resource allocations (TDRAs) and one or more frequency domain resource allocations (FDRAs),
    the first FD slot comprises an UL subband for UL transmissions and a downlink (DL) subband for DL transmissions, and
    based on the one or more FDRAs associated with the first UL channel repetition, a portion of the first UL channel repetition is scheduled to occur in the DL subband of the first FD slot; and
  means for taking one or more actions to transmit the first UL channel repetition based on the scheduling information.

30. A non-transitory computer-readable medium, comprising:
  executable instructions that, when executed by a processor of an apparatus, cause the apparatus to:
    receive scheduling information from a network entity, wherein:
      the scheduling information schedules transmission of a first uplink (UL) channel repetition of a plurality of UL channel repetitions in a first full duplex (FD) slot of a plurality of slots,
      the first UL channel repetition is associated with one or more time domain resource allocations (TDRAs) and one or more frequency domain resource allocations (FDRAs),
      the first FD slot comprises an UL subband for UL transmissions and a downlink (DL) subband for DL transmissions, and
      based on the one or more FDRAs associated with the first UL channel repetition, a portion of the first UL channel repetition is scheduled to occur in the DL subband of the first FD slot; and
    take one or more actions to transmit the first UL channel repetition based on the scheduling information.

* * * * *